(12) United States Patent
Goetz et al.

(10) Patent No.: US 12,099,153 B2
(45) Date of Patent: Sep. 24, 2024

(54) EMITTERS FOR FAST-SPECTRUM SELF-POWERED NEUTRON DETECTOR

(71) Applicant: UT-BATTELLE, LLC, Oak Ridge, TN (US)

(72) Inventors: Kathleen C. Goetz, Knoxville, TN (US); Mustafa S. Cetiner, Lexington, MA (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 294 days.

(21) Appl. No.: 17/510,044

(22) Filed: Oct. 25, 2021

(65) Prior Publication Data

US 2022/0155472 A1 May 19, 2022

Related U.S. Application Data

(60) Provisional application No. 63/113,328, filed on Nov. 13, 2020.

(51) Int. Cl.
*G01T 3/00* (2006.01)
*G21C 17/108* (2006.01)
*G21C 17/10* (2006.01)

(52) U.S. Cl.
CPC ............ *G01T 3/006* (2013.01); *G21C 17/108* (2013.01); *G21C 17/102* (2013.01)

(58) Field of Classification Search
CPC ...... G21C 17/108; G21C 17/102; G01T 3/006

(Continued)

(56) References Cited

U.S. PATENT DOCUMENTS 3,375,370 A 3/1968 Hilborn
3,787,697 A * 1/1974 Shields .................. G01T 3/006
250/393

(Continued)

FOREIGN PATENT DOCUMENTS

CN 112901140 A * 6/2021 ........... G01N 23/222

OTHER PUBLICATIONS

Verma, "Self powered neutron detectors as in-core detectors for sodium-cooled fast reactors", Nuclear Instruments and Methods in Physics Research Section A: Accelerators, Spectrometers, Detectors and Associated Equipment 860 (2017): 6-12. (Year: 2017).*

(Continued)

*Primary Examiner* — Jack W Keith
*Assistant Examiner* — Daniel Wasil
(74) *Attorney, Agent, or Firm* — FOX ROTHSCHILD LLP

(57) ABSTRACT

A detector for generating an electrical current that is proportional to a flux of neutrons includes a neutron sensitive emitter, a conductive collector, an insulator between the neutron-sensitive emitter and the collector, an electrical connection to the neutron sensitive emitter, and an electrical connection to the conductive collector. The neutron sensitive emitter includes an emitter material with no more than 2 stable isotopes, and which upon impact by a neutron having an energy of from 100 keV to 1000 keV will generate electrons in proportion to the flux of neutrons in less than 10 minutes, and any generated electrons not generated in less than 10 minutes will be generated in no less than 30 days. A method of detecting neutrons generated by a nuclear reactor is also disclosed.

16 Claims, 30 Drawing Sheets

(58) Field of Classification Search
USPC .......................................... 376/153, 154, 254
See application file for complete search history.

(56) References Cited

U.S. PATENT DOCUMENTS

| | | | | |
|---|---|---|---|---|
| 3,903,420 | A | * | 9/1975 | Klar .................... G01T 3/006 250/390.01 |
| 4,363,970 | A | | 12/1982 | Allan et al. |

OTHER PUBLICATIONS

Jang, "Sensitivity Analysis of SPNDs by Neutron Spectrum Using Monte Carlo Method", Transactions of the Korean Nuclear Society Spring Meeting, May 2018. (Year: 2018).*

* cited by examiner

EMITTERS FOR FAST-SPECTRUM SELF-POWERED NEUTRON DETECTOR

CROSS-REFERENCE TO RELATED APPLICATIONS

This application claims priority to U.S. 63/113,328 filed on Nov. 13, 2020, entitled "Emitters for Fast-Spectrum Self-Powered Neutron Detector", the entire disclosure of which is incorporated herein by reference.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

The present invention relates generally to nuclear reactors, and more particularly to self-powered neutron detectors for use with nuclear reactors.

BACKGROUND OF THE INVENTION

Self-powered neutron detectors (SPNDs) are a widely used monitoring tool for in-core flux mapping in thermal nuclear reactors. Some key attributes that make them attractive flux monitors include their simplicity, small form factor, and unique ability to generate a signal proportional to the local flux level without an external power source. SPNDs generate an electrical current as a result of nuclear reactions within the neutron-sensitive portion of the detector, termed the emitter. Although SPNDs are a mature technology, almost all devices are designed for optimal performance in thermal-spectrum reactors. Because reaction cross sections in fast reactors are typically much lower—sometimes by orders of magnitudes for certain reaction types—SPND electrical output performance will naturally be negatively impacted. Within the context of nuclear reactors, fast neutron or fast flux terms are used to indicate neutron with higher energy. Likewise, the hard spectrum term may be used to indicate a neutron energy spectrum that peaks at higher energies, typically above 0.1 MeV. The goal of this work is to develop a fast-spectrum SPND (FS-SPND) technology capable of monitoring the changes in the fast neutron flux with reasonable sensitivity and response time. To achieve the highest performance possible, in this research, we focused on the emitter component, which is the sensitive element to the neutron field in the vicinity.

Self-powered neutron detectors (SPND) are a common in-core monitoring tool used for flux mapping in nuclear reactors. The technology was first reported to enable the flux mapping capability for the Canada Deuterium Uranium (CANDU) reactors. The simplicity of the design and the fact that the concept does not require a power source made them an attractive tool for the quantitative assessment of flux distribution in a reactor core. The Versatile Test Reactor (VTR) is a fast spectrum test reactor currently being developed in the United States under the direction of the US Department of Energy's Office of Nuclear Energy. The VTR mission is to enable the accelerated testing of advanced reactor fuels and materials required for advanced reactor technologies. The conceptual design of the 300 MWth sodium-cooled metallic-fueled pool-type fast reactor has been led by the US national laboratories in collaboration with General Electric-Hitachi and Bechtel National Inc.

The VTR primary attributes are as follows. First, it is a sodium-cooled pool-type reactor with modern safety features, such as passive decay heat removal systems that do not require power. The pool configuration will contain the reactor, primary coolant pumps, intermediate heat exchangers, fuel handling machines, and fuel transfer and storage capability. The primary tank and guard vessels will ensure that there is no credible loss of primary coolant scenario. Second, the reactor will have the capability to insert experiments in high-flux areas of the core, including open test assemblies and test vehicles with static or circulating experiment coolant. At least five experiment locations in the core will require electrical and process piping connections that extend through the reactor head. Third, the reactor power level and test location fast neutron (>0.1 MeV) flux are projected to be 300 MWth and $>4\times10^{15}$ n/cm$^2$ s, respectively. This power level provides the desired performance and maintains significant safety and experimental margins to maintain versatility for future operations. Fourth, the fuel is a metal alloy that contains uranium-20% plutonium-10%, and zirconium (uranium enrichment 5% $^{235}$U). Fifth, the reactor heat is rejected to the atmosphere. Electricity generation is not planned.

Characterization of the neutron flux in the vicinity of experiment locations is important for a successful VTR mission. While there are a variety of options to measure neutron flux, real time and offline, SPNDs offer significant advantages for the design and fabrication of experimental vehicles primarily because of their small form factor.

The disclosed technologies relate to emitter materials that outperform the sensitivity of commercially available SPNDs in harder neutron flux spectrum. The motivation stemmed from the fact that existing devices are exclusively designed for service in thermal-spectrum reactors. However, for a generic neutron spectrum in a fast-spectrum reactor, capture reaction rates are significantly lower than those in a thermal-spectrum reactor, thus diminishing the expected current output of the device and inevitably limiting its useful dynamic range. A comparison of the neutron fluxes in a thermal light-water reactor and a sodium-cooled fast reactor (SFR) is shown in FIG. 1. It shows an upward shift in average neutron energy, resulting in a downward shift in reaction cross section, as expected in SFRs.

A typical SPND comprises a neutron-sensitive emitter, an insulator (usually MgO or $Al_2O_3$), and a collector (usually made of Inconel 600) in a coaxial geometry. Neutrons are captured within the emitter, resulting in reactions that produce electrons with energies high enough to escape the emitter and travel through the insulator to the collector.

SPNDs generate an electrical current that is directly proportional to the reactor neutron flux. The current in the detector stems from electrons produced by nuclear reactions in the emitter reaching the collector. If an electron does not escape the emitter, zero current will be generated. Electrons stopping in the insulator might induce leakage currents in the detector through the buildup of an electromagnetic field. Depending on the direction of the resultant field, this process could be beneficial by pushing electrons out to the collector or harmful by pushing them back toward the emitter. The neutron flux spectrum will change with the type of reactor, as shown in FIG. 1.

There are two primary types of SPNDs that are designated based on the dominant mechanism by which the current is generated: delayed and prompt. All SPNDs have some prompt and some delayed component of the detector response. The prompt component is due to (γ,e⁻) electron knockout reactions from reactor γ rays and γ rays emitted following neutron scattering. The delayed component is produced due to nuclear β⁻ decay. Another electron producing reaction in the detector is ionization along the electron's path.

Delayed-type SPNDs produce a majority of their signal through an (n, β⁻) reaction, which is nuclear β⁻ decay following the capture of an incident neutron. An electric current is generated in the detector when the β⁻ particle, which is an electron, travels to the collector. FIG. 2 is a reaction mechanism diagram for the (n, β⁻) driving signal production in delayed-type SPNDs. Delayed-type SPNDs generally have a stronger signal per unit flux of the two SPND types, but the response time of the detector to changes in reactor flux is comparatively long because it is dictated by the β-decay half-life of the neutron-capture reaction product. The response time of a rhodium SPND ($T_{1/2}$=42 s for the dominant β⁻ decay channel) to a step change in neutron flux is approximately 4 minutes. The prolonged response time makes these detectors useful predominantly for monitoring steady state operations and observe slowly changing power dynamics, such as power drift due to fuel burnup.

Alternatively, prompt-type SPNDs generate most of their electric current through the (n, γ) (γ, e⁻) reaction series, in which a neutron is captured and the resulting nucleus de-excites through γ-ray emission. FIG. 3 is a reaction mechanism diagram for the (n, γ) (γ, e⁻) reaction series driving signal production in prompt-type SPNDs. Current is produced when the resultant γ ray knocks an electron out of the neighboring atom through Compton scattering, the photoelectric effect or pair production, and that electron reaches the collector. Prompt-type SPNDs respond instantaneously to changes in neutron flux but often produce smaller signals per unit flux due to the necessity of two reactions occurring in tandem to generate a current in the detector.

Conventional SPNDs are optimized for thermal neutron interactions. Because neutron-capture cross sections in the fast energy region are often orders of magnitude lower than those at thermal energies, the device performance (i.e., electrical current output at a given neutron flux level) will inevitably deteriorate in a neutron flux, peaking at 0.5 MeV as is common in fast-reactor spectra. Therefore, any increase in reaction rates within the emitter will help improve the device sensitivity and boost the signal-to-noise ratio in the final detector.

The development of next-generation SPNDs for use in fast reactors, or fast-spectrum SPND (FS-SPND), has centered around SPND technology for sensitivity to 0.5 MeV neutrons. Platinum has been identified as one such candidate.

SUMMARY OF THE INVENTION

A detector for generating an electrical current that is proportional to a flux of neutrons includes a neutron sensitive emitter, a conductive collector, an insulator between the neutron-sensitive emitter and the collector, an electrical connection to the neutron sensitive emitter, and an electrical connection to the conductive collector. The neutron sensitive emitter includes an emitter material with no more than 2 stable isotopes, and which upon impact by a neutron having an energy of from 100 keV to 1000 keV will generate electrons in proportion to the flux of neutrons in less than 10 minutes. Any electrons not generated in less than 10 minutes will be generated in no less than 30 days. The detector can be configured as a self-powered neutron detector (SPND). The SPND can be a prompt-type SPND.

The neutron-sensitive emitter can include a Ta alloy. The Ta alloy can include ASTAR-811C. The Ta alloy can include T-111. The neutron-sensitive emitter can include at least one selected from $^{181}$Ta, $^{159}$Tb, and $^{169}$Tm.

The neutron-sensitive emitter can include at least one selected from Lu and Ir. The Lu can include at least one selected from $^{175}$Lu and $^{176}$Lu. The Ir can include at least one selected from $^{191}$Ir and $^{193}$Ir.

The insulator can include at least one selected from the group consisting of $MgO$, $Al_2O_3$, and vacuum. The collector can be a sheath with an open interior, and the emitter and the insulator can be positioned within the interior. The emitter material can be provided on a conductive support mounted within the open interior of the collector sheath, and the insulator can be positioned between the emitter material and the collector sheath. The collector can include stainless steel or Inconel.

The detector can provide a signal to noise ratio of greater than 1.5 for neutrons having an energy of between 100 keV and 1000 keV. The detector can further include a current meter for measuring the electrical current generated by the flux of neutrons striking the emitter. The detector can further include a processor for relating the current measured by the current meter to the neutron flux.

A method of detecting neutrons generated by a nuclear reactor, can include the step of providing a neutron detector comprising a neutron sensitive emitter, a conductive collector, an insulator between the neutron-sensitive emitter and the collector, an electrical connection to the neutron sensitive emitter, and an electrical connection to the conductive collector. The neutron sensitive emitter includes an emitter material with no more than 2 stable isotopes, and which upon impact by a neutron having an energy of from 100 keV to 1000 keV will generate electrons in proportion to the flux of neutrons in less than 10 minutes or more than 30 days.

The neutron detector is exposed to neutrons having an energy of from. 100 keV to 1000 keV, wherein electrons will be generated by the emitter material in proportion to the flux in less than 10 minutes. Any generated electrons not generated in less than 10 minutes will be generated in no less than 30 days.

The electrons can be generated in less than 5 minutes. The method can provide that any electron not generated in less than 5 minutes will be generated in no less than 72 days. The nuclear reactor can be configured as a fast-spectrum nuclear reactor. The detector can provide a signal to noise ratio of greater than 1.5 for neutrons having an energy of between 100 keV and 1000 keV.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
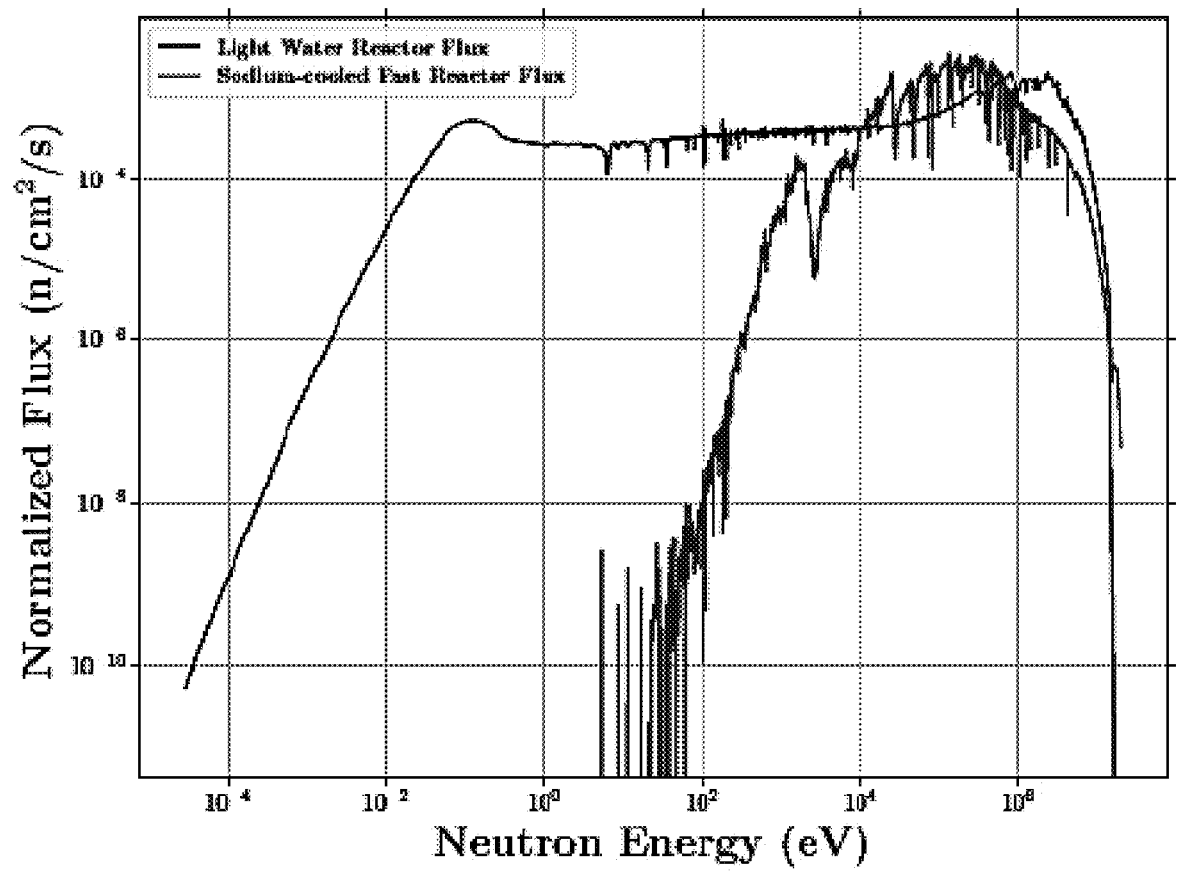
FIG. 1 is a plot of Normalized Flux (n/cm²/s) vs. Neutron Energy (eV) for a light water reactor flux and a sodium-cooled fast reactor flux.
Figure 2:
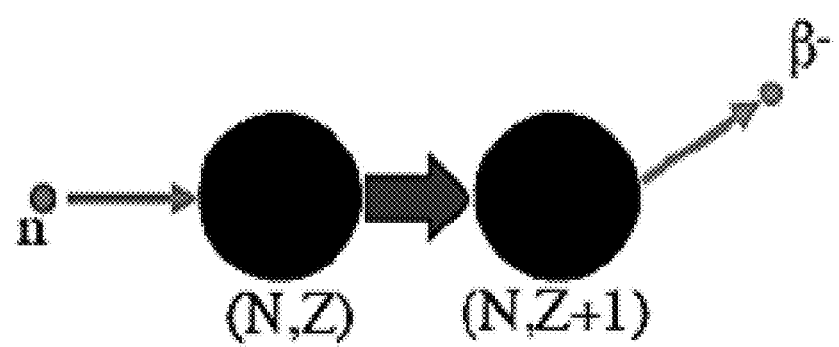
FIG. 2 is a schematic depiction of a reaction mechanism diagram for the (n, β−) driving signal production in delayed-type SPNDs.
Figure 3:
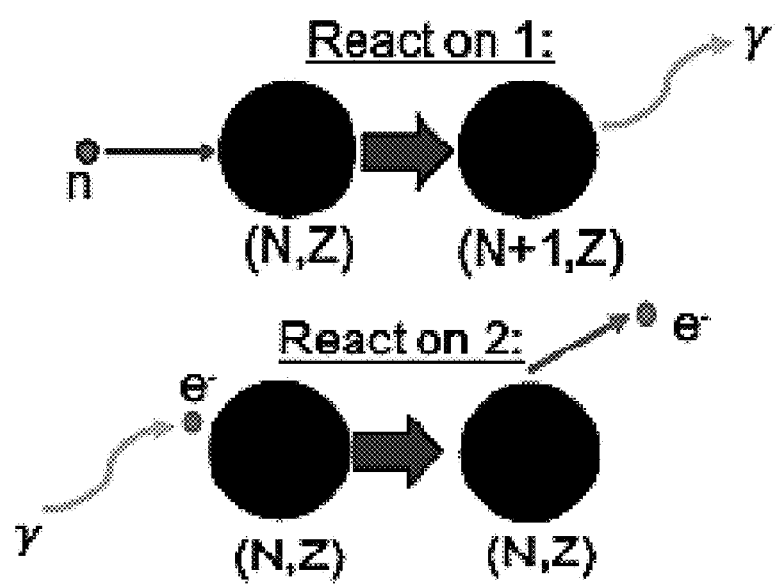
FIG. 3 is a schematic depiction of a reaction mechanism diagram for the (n, γ) (γ, e−) reaction series driving signal production in prompt-type SPNDs.

A detector for generating an electrical current that is proportional to a flux of neutrons includes a neutron sensitive emitter, a conductive collector, an insulator between the neutron-sensitive emitter and the collector, an electrical connection to the neutron sensitive emitter, and an electrical connection to the conductive collector. The neutron sensitive emitter includes an emitter material with no more than 2 stable isotopes, and which upon impact by a neutron having an energy of from 100 keV to 1000 keV will generate electrons in proportion to the flux of neutrons in less than 10 minutes, and any generated electrons not generated in less than 10 minutes will be generated in no less than 30 days. The detector can be configured as a self-powered neutron detector (SPND). The SPND can be a prompt-type SPND.

The neutron-sensitive emitter can include a Ta alloy. The Ta alloy can be ASTAR-811C. The Ta alloy can be T-111. The neutron-sensitive emitter material can include at least one selected from the group of $^{181}$Ta, $^{159}$Tb, and $^{169}$Tm.

The neutron-sensitive emitter can also include at least one selected from the group of Lu and Ir. The Lu in the neutron-sensitive emitter can include at least one selected from the group of $^{175}$Lu and $^{176}$Lu. The Ir can include at least one selected from the group of $^{191}$Ir and $^{193}$Ir.

The insulator can include at least one selected from the group of MgO, $Al_2O_3$, and vacuum. Other insulators are possible.

The collector can be configured as a sheath with an open interior, and the emitter and the insulation can be positioned within the interior. The emitter material can be provided on a conductive support mounted within the open interior of the collector sheath, and the insulator can be positioned between the emitter material and the collector sheath. The collector can be made of any suitable material. The collector can be made of stainless steel. The stainless steel can be Inconel.

The detector can provide a signal to noise ratio of greater than 1.5 for neutrons having an energy of between 100 keV and 1000 keV.

A method of detecting neutrons generated by a nuclear reactor includes the step of providing a neutron detector comprising a neutron sensitive emitter; a conductive collector; an insulator between the neutron-sensitive emitter and the collector; an electrical connection to the neutron sensitive emitter; and an electrical connection to the conductive collector. The neutron sensitive emitter comprises an emitter material with no more than 2 stable isotopes, and upon impact by a neutron having an energy of from 100 keV to 1000 keV will generate electrons in proportion to the flux of neutrons in less than 10 minutes or more than 30 days. The neutron detector is exposed to neutrons having an energy of from 100 keV to 1000 keV. Electrons will be generated by the emitter material in proportion to the flux in less than 10 minutes, and any generated electrons not generated in less than 10 minutes will be generated in no less than 30 days. The electrons generated by the emitter in proportion to the neutron flux can be generated in less than 1 s, 2 s, 3 s, 4 s 5 s, 6 s, 7 s, 8 s, 9 s, 10 s, 20 s, 30 s, 40 s, 50 s, 1 min, 2 min, 3 min, 4, min, 5, min, 6 min, 7 min, 8 min, 9 min, or 10 min, or within a range of any high value and low value selected from these values. Any electron not generated in less than 10 minutes will be generated in no less than 30 days. Any electron not generated in less than 10 min will be generated in no less than 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72 days, or within a range of any high value and low value selected from these values.

The detector can further include a current meter for measuring the electrical current generated by the flux of neutrons striking the emitter. The detector can further include a processor for relating the current measured by the current meter to the neutron flux.

For a given neutron to be captured by a nucleus, the nucleus must have a "target" resonance equal to the total neutron energy to which it can excite. If it is desired to maximize the capture of a spectrum of neutrons, it is beneficial that the nuclei have many closely grouped states providing a range of suitable targets at energies that coincide with the peak of the neutron spectrum.

Nuclear level structure is the macroscopic result of the summation of all possible microscopic couplings of the nucleon wave functions, and an increase in nucleon number (A) will likely result in heightened density of states. A notable exception to the correlation between higher A nuclei and level density occurs around magic numbers because these nuclei are heavily structural in nature. Additionally, odd, especially odd proton number (Z), nuclei are likely to present with increased level densities because the odd nucleon effectively occupies a single particle state above an even-even "core," forming a valence wave function with more options for coupling. Nuclei with A>150 are likely to be deformed. Deformation also adds to the complexity of the nuclear wave function as it breaks nuclear spherical symmetry, introducing a new quantum number. This new quantum number provides more modes by which nucleons can couple, resulting in level splitting and thus increased level density. It can thus be concluded that suitable emitters are likely to be found in stable, mid-shell, odd Z nuclei located in the region between double magic $^{132}$Sn and $^{208}$Pb, as highlighted in FIG. 4.

The following equation can be used to calculate the energy group cross sections:

$$\sigma_\xi^g = \frac{\int_{E_g} dE\phi(E)\sigma_\xi(E)}{\int_{E_g} dE\phi(E)}, \quad (1)$$

where $\sigma_\xi^g$ is the microscopic group cross section for energy group g for reaction type $\xi$, $\sigma_\xi(E)$ is the microscopic cross section for reaction type (as a function of energy, $E_g \in [E_{g-1}, E_g]$ is the corresponding energy range for the analysis domain, and $\phi(E)$ is the scalar flux. The dominant reaction types are absorption and scattering. The absorption process includes radiative capture and fission reactions, and scattering includes elastic and inelastic scattering.

Figure 4:
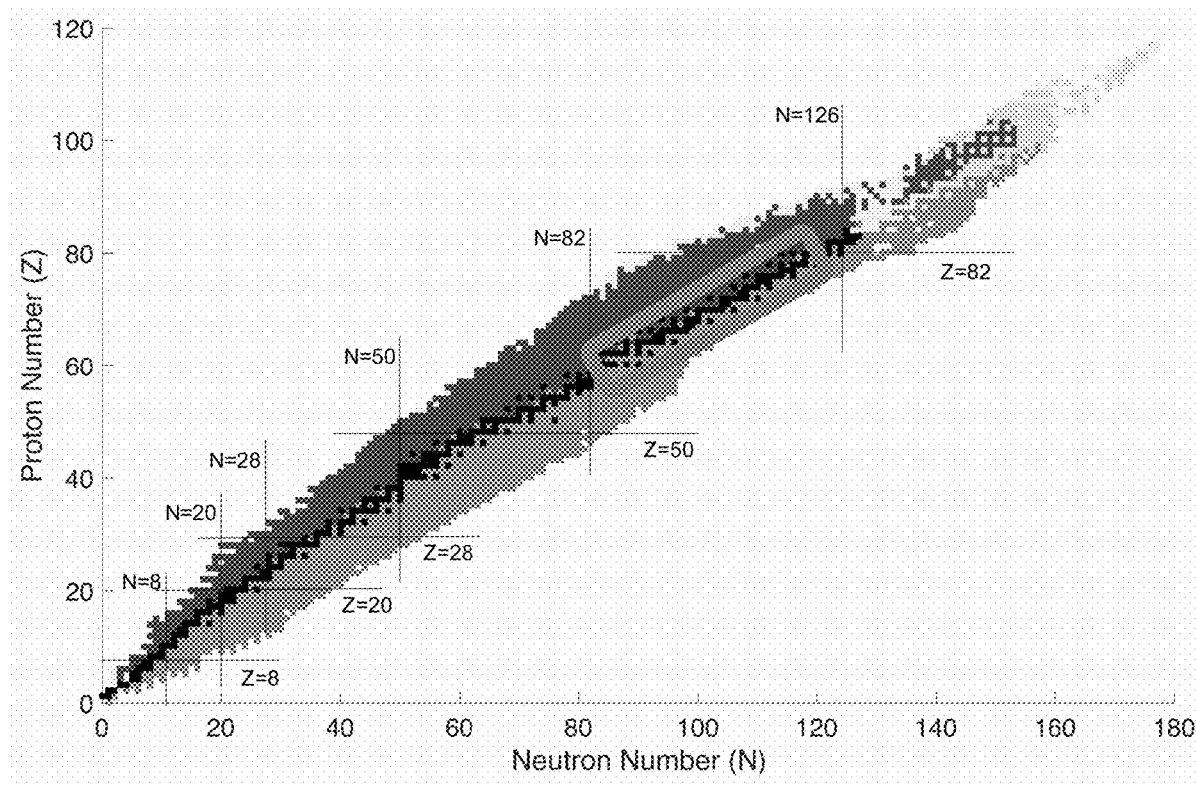
FIG. 4 is a plot of Proton Number (Z) vs. Neutron Number (N) for a plurality of nuclides highlighting β− decay, β+ decay, emission, fission, and stable.

FIG. 4 is a chart of the nuclides with magic numbers marked. Color represents the dominant decay path of the nucleus. The region that is likely to contain nuclei that would be suitable emitters for use in fast reactors is encircled in gray.

The macroscopic group cross section for a homogeneous material for reaction $\xi$, $\Sigma_\xi^g$ is then calculated via the following expression:

$$\Sigma_\xi^g = N\sigma_\xi^g, \quad (2)$$

where N is the atomic number density of the material. For materials with multiple isotopes, this expression is carried out individually for each isotope, and then the cross section is the sum of all corrected by natural abundance percentages. Here, the total macroscopic cross section represents the probability of all possible interactions that neutrons can undergo per unit path length traveled in the medium.

The reaction rate of type $\xi$ for energy group g as a function of time is calculated by using the following expression:

$$R_\xi^g(t) = \int_{E_g} dE N(t)\phi(E,t)\sigma_\xi(E), \quad (3)$$

where N(t) is the atomic number density for the material, and $\phi(E, t)$ is the scalar flux, both as a function of time. Similarly, the time-dependent burnup rate, b(t), of the emitter material at a given time t is defined as $$b(t) = \int_0^\infty dE N(t)\phi(E,t)\sigma_a(E), \quad (4)$$

where $\sigma_a(E)$ is the neutron absorption cross section for the emitter material. Likewise, the time-integrated burnup, B(t), of the emitter material at a given t is calculated by $$B(t) = \int_0^t d\tau b(\tau) = \int_0^t d\tau N(\tau) \int_0^\infty dE\phi(E,\tau)\sigma_a(E). \quad (5)$$

Figure 5:
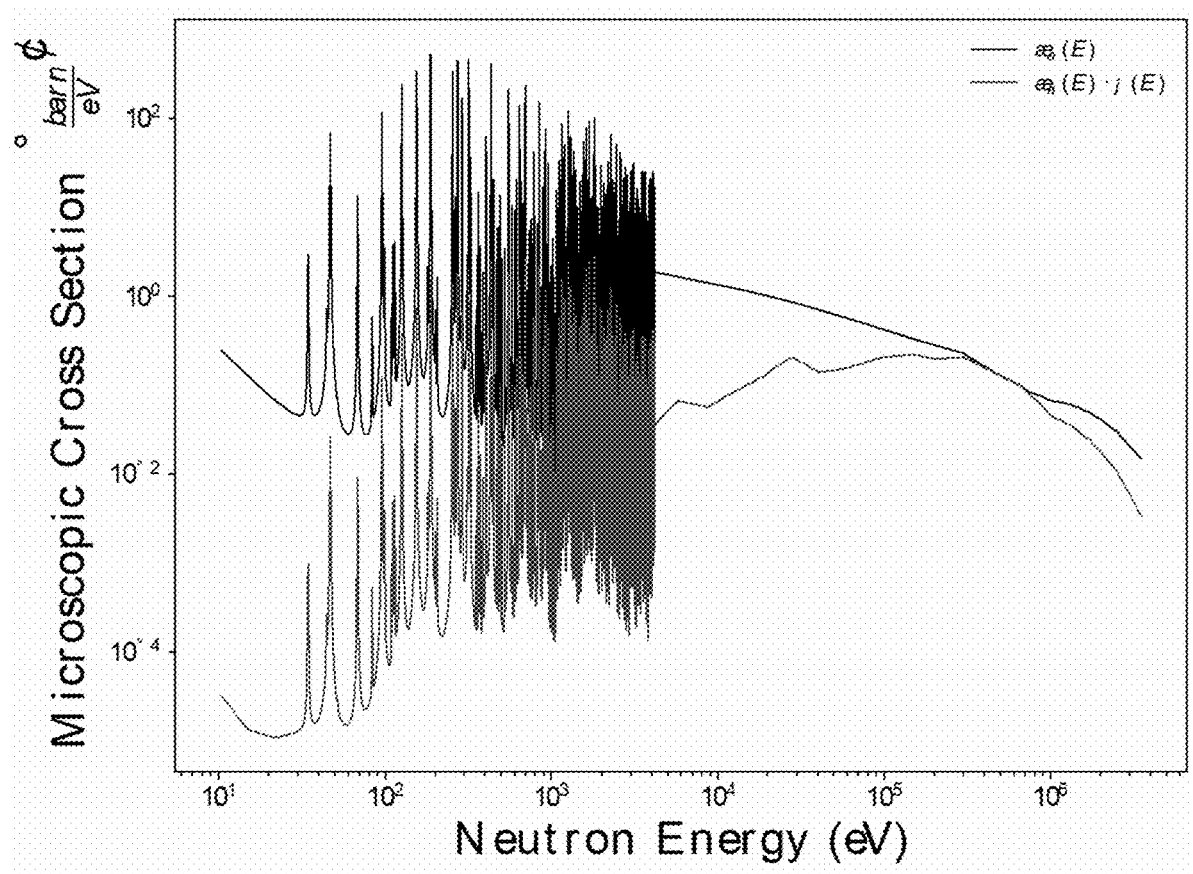
FIG. 5 is a microscopic cross section data for 103Rh from ENDF and the resultant group cross section data.

To tune the SPND design for use in a fast reactor and maximize overall detector sensitivity, a generic neutron flux spectrum from an SFR from Verma et al. was used to calculate group microscopic (n,γ) cross sections from ENDF data for a wide range of nuclei. V. Verma, "Self powered neutron detectors as in-core detectors for sodium cooled fast reactors", Nuclear Instruments and Methods in Physics Research Section A: Accelerators, Spectrometers, Detectors and Associated Equipment 860 (2017) 6-12. Datasets were taken preferentially from ENDF/B-VII.1, ENDF/B-VIII.0, and JEFF-3.3 databases in that order, depending on availability. An example of the result of the process is shown in FIG. 5 for $^{103}$Rh. FIG. 5 is a microscopic cross section data for $^{103}$Rh from ENDF (black) and the resultant group cross section data (grey). Neutron flux was taken from a published SFR spectrum.

Both full-group (i.e., across the full energy of the reactor neutron spectrum) and fast-group (0.5-2.0 MeV) microscopic and macroscopic cross sections were calculated, as demonstrated in Eq. (1) and Eq. (2), respectively. The reaction rate, as shown in Eq. (3), and burnup per month, as shown in Eq. (5), for the full- and fast-groups was also calculated. The calculated burnup rate for a commonly used emitter material, $^{103}$Rh, in a thermal neutron flux was compared to that in literature. The calculated burnup rate was 0.39%, which matched the published value exactly.

Figure 6:
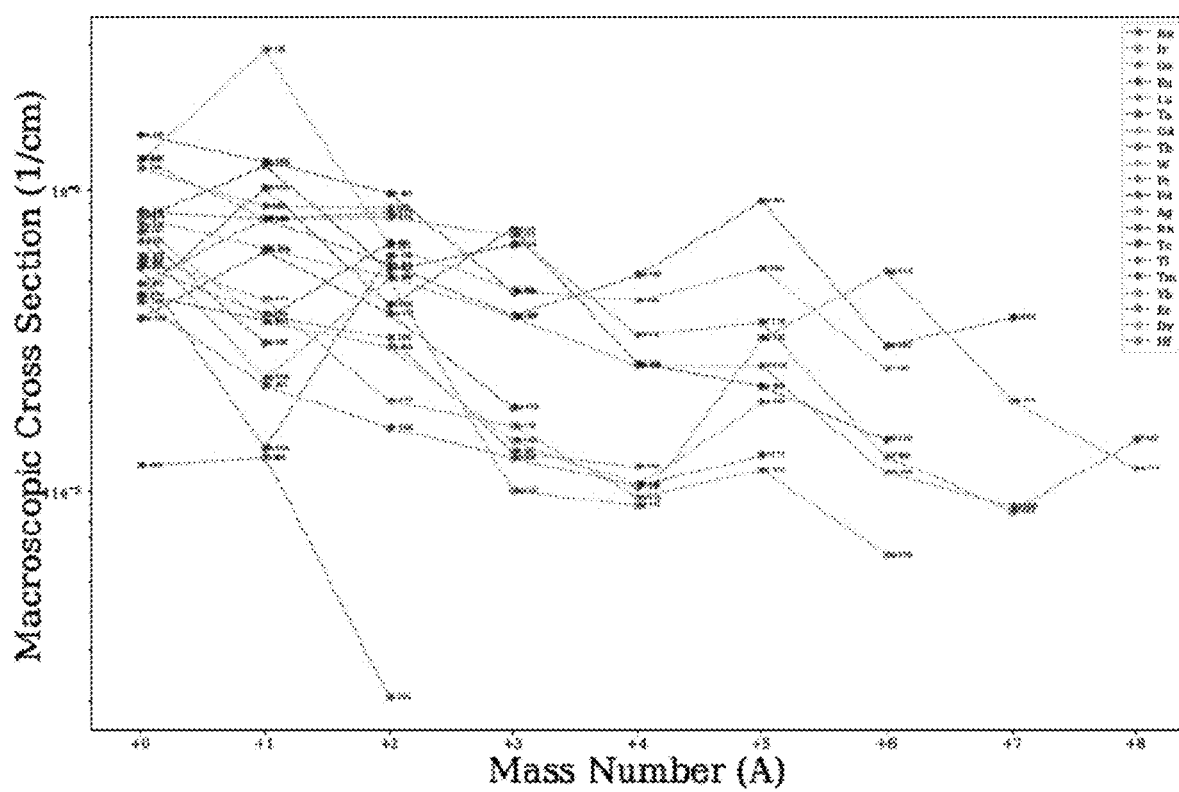
FIG. 6 is a fast group (0.5-2.0 MeV) macroscopic cross section per unit volume ($cm^3$) of all emitter candidates.

Potential emitter materials were chosen based on several general criteria before being further down-selected by nuclear-physics driven constraints that determine the SPND type. The results from this stage of the analysis indicated rhenium, iridium, osmium, europium, lutetium, tantalum, gadolinium, terbium, tungsten, platinum, palladium, silver, rhodium, technetium, thallium, thulium, ytterbium, erbium, dysprosium, and hafnium as possible candidates. A comparison of the fast-group (n, γ) macroscopic cross sections for a unit volume of material is shown in FIG. 6. FIG. 6 is fast group (0.5-2.0 MeV) macroscopic cross section per unit volume (cm$^3$) of all emitter candidates. The x axis is mass number A from the first stable isotope.

The materials were then selected for survivability within the environment, limiting to materials with melting points above 1,000° C., which eliminated europium and ytterbium. Additionally, elements with one or two stable isotopes were found to render enrichment of emitter materials unnecessary and minimize the complexity of the FS-SPND fabrication. This process further eliminated palladium, osmium, gadolinium, tungsten, erbium, dysprosium, platinum, and hafnium. Platinum as noted is already used as an emitter in SPGDs deployed in CANDU reactors. The final general constraints were that all emitter materials must be available, and readily machinable. The latter criterion excluded highly poisonous materials, such as thallium, and radioactive materials, such as technetium leaving rhenium, iridium, lutetium, tantalum, terbium, silver, rhodium, and thulium, as possible candidates.

To minimize background noise in prompt-type SPNDs, the reaction product of the neutron-capture reaction in the emitter must have a sufficiently long β decay half-life, preferably at least 30-72 days, to not compete with the primary (γ, e$^-$) reaction channel. Any β$^-$ decay will introduce a comparatively slow detector response that is effectively an ever-building background component to the signal responding to changes in neutron flux but on a slow enough time scale as to be undesirable. An emitter with a large proportion of nuclei with β decay half-lives of sufficiently short duration could eventually introduce enough background noise that the desired signal could be over-whelmed. Additionally, all prompt-type emitters should have large proton numbers (Z) to maximize the number of electrons available in the material for the signal-producing reaction.

Alternatively, it is desired that products of the (n, β–) reaction in delayed-type emitters have as short a β decay half-life as possible preferably less than 10 min. The preference is for a β decay half-life on the order of seconds because the response time of the detector to changes in neutron flux is directly related to the duration of the β decay half-life of the reaction product. The β decay daughter of the reaction product should be stable because, similarly to the prompt-type SPND, β$^-$ decay at this stage would introduce an undesired background noise component to the overall detector response and could dampen the detector response time. Because signal in SPNDs is only produced when electrons reach the collector, it is desirable to elect materials likely to produce higher energy and thus more penetrating β$^-$ particles. For delayed-type SPNDs, this is accomplished by selecting emitter materials with (n, β$^-$) reaction products that have a large amount of energy available to be released via β– decay, a factor represented by a high $Q_\beta$ value, and strong feeding to the ground and lowly-excited states in their respective β– decay daughters.

Figure 7A:
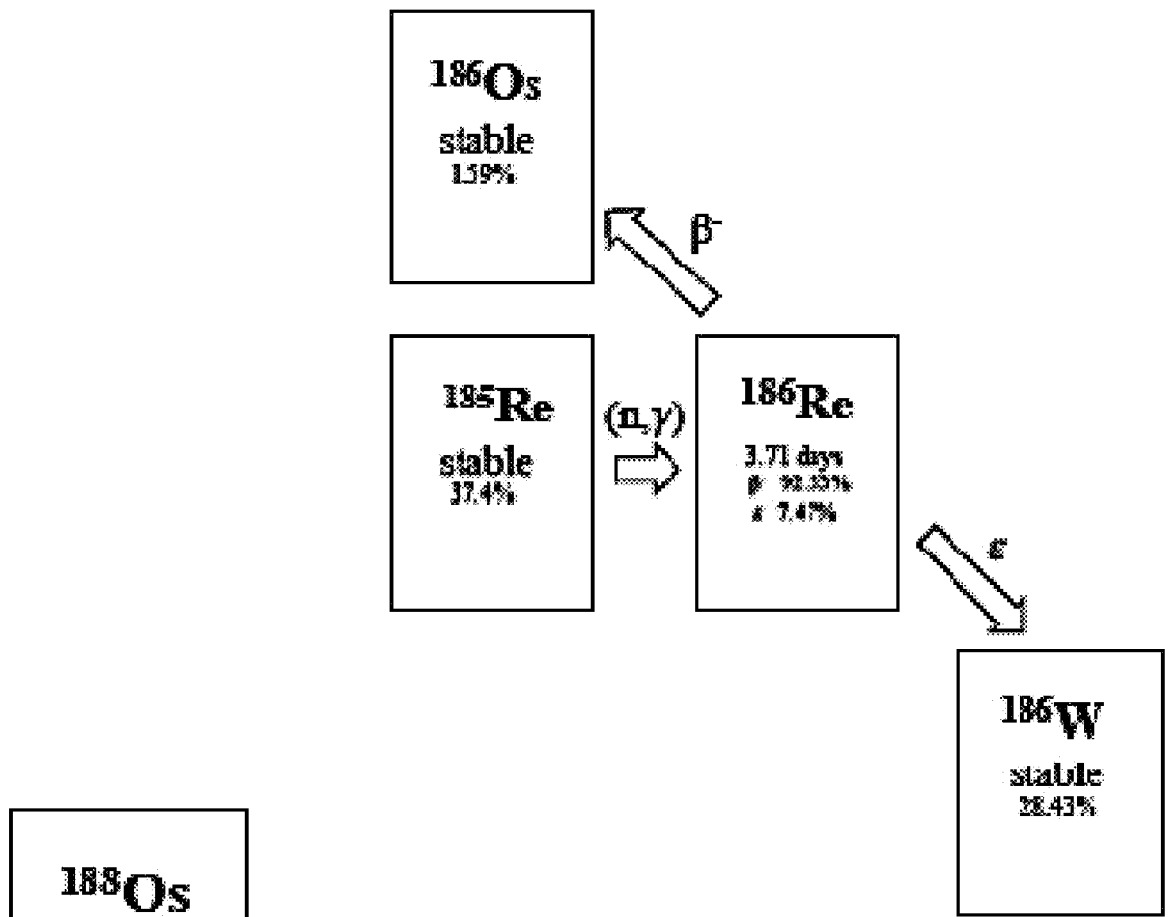
FIG. 7(a) is a diagram of the $^{185}$Re reaction chain.
Figure 7B:
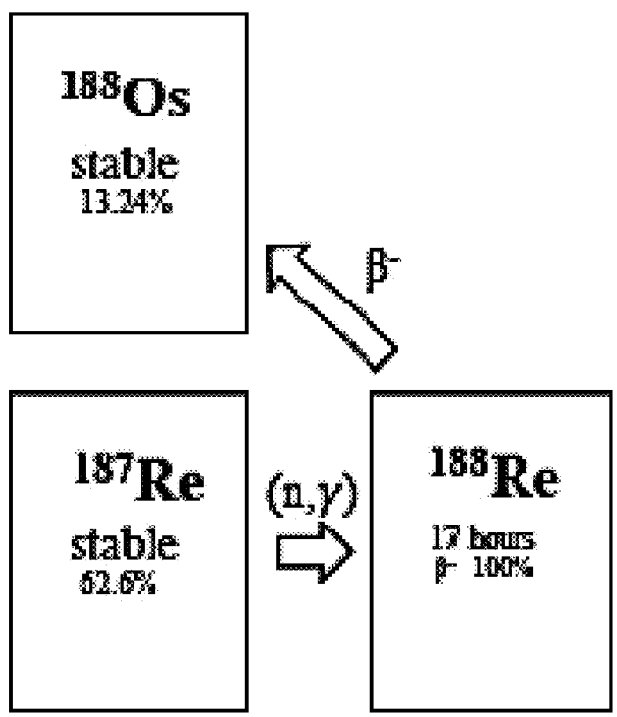
FIG. 7(b) is a diagram of the $^{187}$Re reaction chain.
Figure 8:
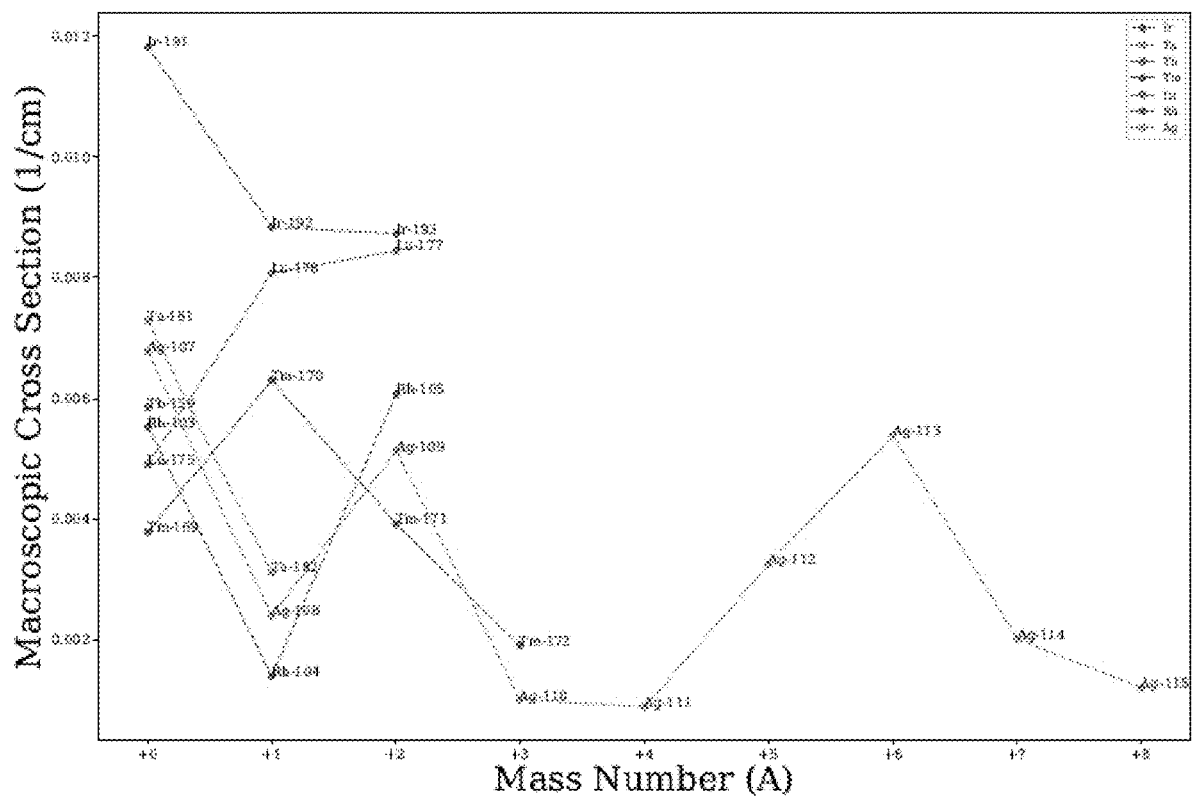
FIG. 8 is a depiction of a fast group (0.5-2.0 MeV) macroscopic cross sections for the down selected emitter candidates.

These constraints removed rhenium from the list of candidates. As shown in FIGS. 7(a) and 7(b), rhenium has two stable isotopes: $^{185}$Re and $^{187}$Re. The first neutron-capture reaction products, $^{186}$Re and $^{188}$Re, have β decay half-lives of 3.7 days and 17 h, respectively. FIG. 7(a) is a diagram of the $^{185}$Re reaction chain. FIG. 7(b) is a diagram of the $^{187}$Re reaction chain. The diagrams include β decay half-lives and the natural abundance, if stable. These half-lives are both too short to make rhenium an ideal candidate for a prompt-type emitter and too long to make an ideal delayed-type emitter. This leaves iridium, lutetium, tantalum, terbium, silver, rhodium, and thulium—the fast-group macroscopic cross sections that are shown in FIG. 8. FIG. 8 is a depiction of a fast group (0.5-2.0 MeV) macroscopic cross sections for the down selected emitter candidates. The x axis is the mass number from the first stable isotope.

Electrical current in both SPND types is also produced through a (γ, e$^-$) reaction due to interactions with prompt γ flux and γ rays from neutron scattering reactions, the detector response to which is always immediate. To include the effect of these prompt signal components in the emitter selection process, a model of an SPND by using the Monte Carlo simulation toolkit, Geant4 version 10.6.1 was generated. The Geant4 model uses the following physics packages: G4HadronPhysicsQGSP_BIC_HP, G4IonElasticPhysics, G4IonPhysicsXS, G4StoppingPhysics, G4EmStandardPhysics_option4, G4Decay Physics, and G4RadioactiveDecayPhysics.

Because many of the required cross section data were not in Geant4's G4NDL database, the nuclear cross section database based on ENDF/B-VII.1 data generated for Geant4 were used. This database was expanded by using the AMPX-6 code to broaden the afore-mentioned cross section data for temperatures ranging from 22 to 750° C. to allow an irradiation temperature to be set within the simulation space. The appropriate cross section database, and thus the irradiation temperature, was selected at runtime through the G4NEUTR0NHPDATA environmental variable.

The Geant4 model was validated by using a rhodium SPND with the detector dimensions shown in Table 1.

TABLE 1

Dimensions of rhodium SPND used for validation.

| Component | Material | $R_{in}$ (mm) | $R_{out}$ (mm) | Length (mm) |
|---|---|---|---|---|
| Emitter | $^{103}$Rh | 0 | 23 | 200 |
| Insulator | MgO | 23 | 23.25 | 200 |
| Collector | Inconel 600 | 23.25 | 23.5 | 200 |

An irradiation temperature of 400° C. was selected, and an impulse beam (released at T=0) of 10$^8$ thermal neutrons was directed at the emitter. The results showed that 15% of the signal was prompt, falling within the typical range of 7-15% expected for a rhodium SPND.

Figure 9:
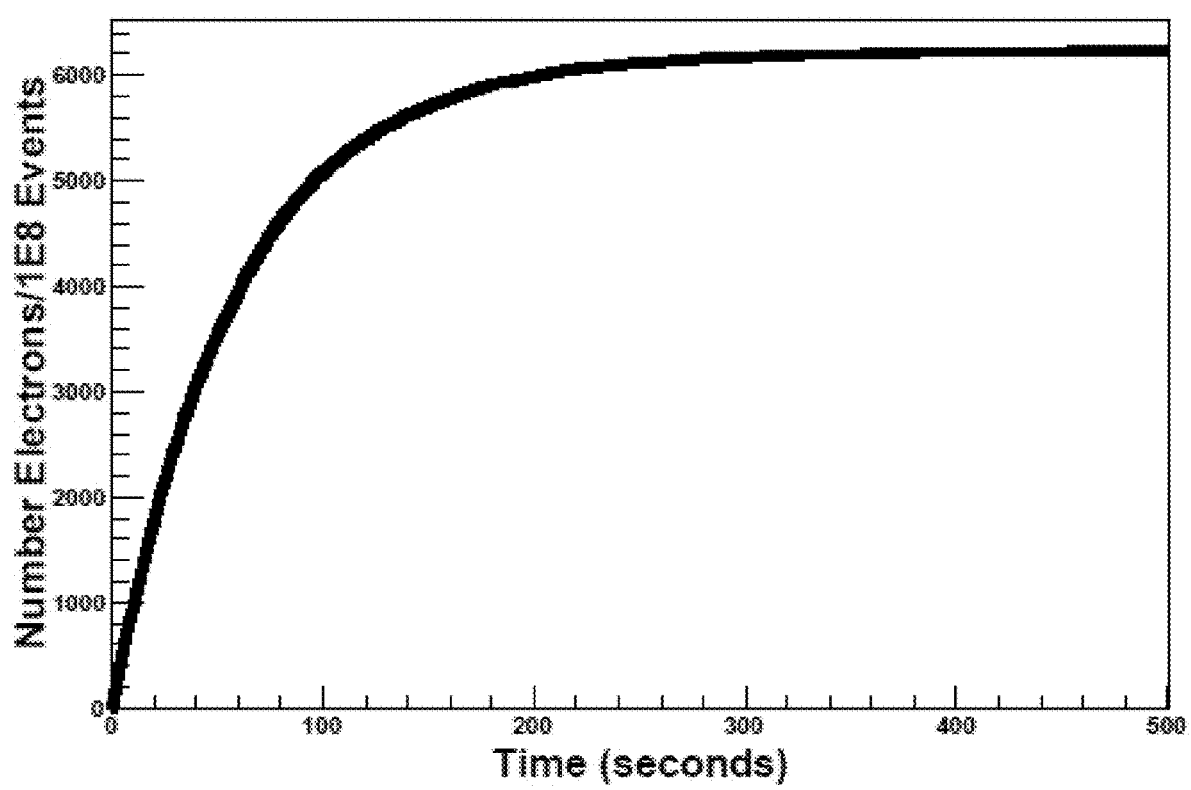
FIG. 9 shows the results from a Geant4 simulation of a rhodium SPND showing the number of electrons produced in the emitter from the β decay of the $^{104}$Rh per $10^8$ events.

Additionally, the response time of the detector was simulated. Because rhodium SPNDs are a delayed-type detector, this quantity is driven by the β decay half-life of $^{104}$Rh, which is produced by neutron capture on $^{103}$Rh. The delayed portion of response, shown in FIG. 9, reached its steady state value at approximately 4.8 min (time constant T=59.5 seconds). FIG. 9 shows the results from a Geant4 simulation of a rhodium SPND showing the number of electrons produced in the emitter from the β decay of the $^{104}$Rh per 10$^8$ events.

SPNDs with a generic geometry were simulated, assuming natural elemental abundances for each material and an irradiation temperature of 400° C. The insulator and collectors remained unchanged for each simulation, and comprised MgO and Inconel 600, respectively. The detector was set in a simulated pipe filled with magnesium salt. The primary, or incident, particles in the simulation were a spectrum of neutrons and γ rays derived from the neutron flux and prompt γ field for an SFR. Primary particles were formed into a beam and aimed at the emitter to maximize the likelihood of interaction with the emitter of the simulated detector. All particles were emitted as a simulated reactor impulse produced at time T=0 in the simulation space. Reaction products, including reaction chains in cases such as double neutron-capture, were allowed to grow in and decay out within the simulation. The end result of the simulation is a tally of the total number of electrons generated in the emitter. Comparing this number across the selected candidates provides a measure of the relative merit of each material. No attempt to sum electrons in the collector was made because each material will produce a different electron spectrum. As such, the number of electrons that can escape the emitter and travel to the collector will highly depend on emitter and insulator thicknesses and must be optimized for each material.

Five emitter candidates were identified for prompt-type SPNDs, four of which, are new, and two candidates for delayed-type SPNDs, both of which are currently used emitter materials. The prompt-type emitter materials are shown in Table 2, and the delayed-type materials are shown in Table 3. The results are listed in order of judged suitability based on the fast-group macroscopic (n, γ) cross section, the number and relative abundance of stable isotopes, the β decay half-lives of the reaction products, and expected reaction and burnup rates. Iridium is the only known, if rarely used, emitter in this table. Table 2 includes top emitter candidates for prompt-type SPNDs listed in order of suitability. $\Sigma_\gamma$ is the fast-group (n, γ) cross section (0.5-2.0 MeV). $T_{1/2}$ represents the β decay half-life of the reaction product, and burnup (B) is calculated at a neutron flux of $\varphi \phi = 5 \times 10^{15}$ n/cm² s for neutron energies between 0.5-2.0 MeV.

TABLE 2

| Isotope | $\Sigma_\gamma \left( \frac{1}{cm} \right)$ | B/month (%) | $T_{\frac{1}{2}}$ |
|---|---|---|---|
| $^{181}$Ta | 0.00728 | 0.17 | 114 days |
| $^{159}$Tb | 0.00585 | 0.25 | 72 days |
| $^{169}$Tm | 0.00378 | 0.15 | 128 days |
| $^{175}$Lu | 0.00491 | 0.19 | stable |
| $^{176}$Lu | 0.00807 | 0.31 | 6.6 days |
| $^{191}$Ir | 0.01183 | 0.22 | 73 days |
| $^{193}$Ir | 0.00873 | 0.16 | 19 h |

The burnup rate, b, of the emitter is a strong indicator of the sensitivity of the detector. The B/month from fast-group neutrons with energies between 0.5-2.0 MeV, as shown in Table 2, are comparable with those of rhodium in a thermal neutron field (0.39%). Rhodium is a high-sensitivity emitter when operating in a thermal reactor; thus, the emitter materials are similarly sensitive when operating in a fast-spectrum reactor.

Table 3 includes top emitter candidates for delayed-type SPNDs listed in order of suitability. $\Sigma_\gamma$ is the fast-group (n,γ) cross section (0.5-2.0 MeV). $T_{1/2}$ represents the β decay half-life of the reaction product, and burnup (B) is calculated at the thermal neutron flux of $\varphi = 5 \times 10^{15}$ n/cm² s for neutron energies between 0.5-2.0 MeV.

TABLE 3

| Nucleus | $\Sigma_\gamma \left( \frac{1}{cm^3} \right)$ | B/month (%) | $T_{\frac{1}{3}}$ |
|---|---|---|---|
| $^{103}$Rh | 0.00553 | 0.10 | 42 s |
| $^{107}$Ag | 0.00677 | 0.15 | 2.4 min |
| $^{109}$Ag | 0.00513 | 0.12 | 24.6 s |

Figure 10:
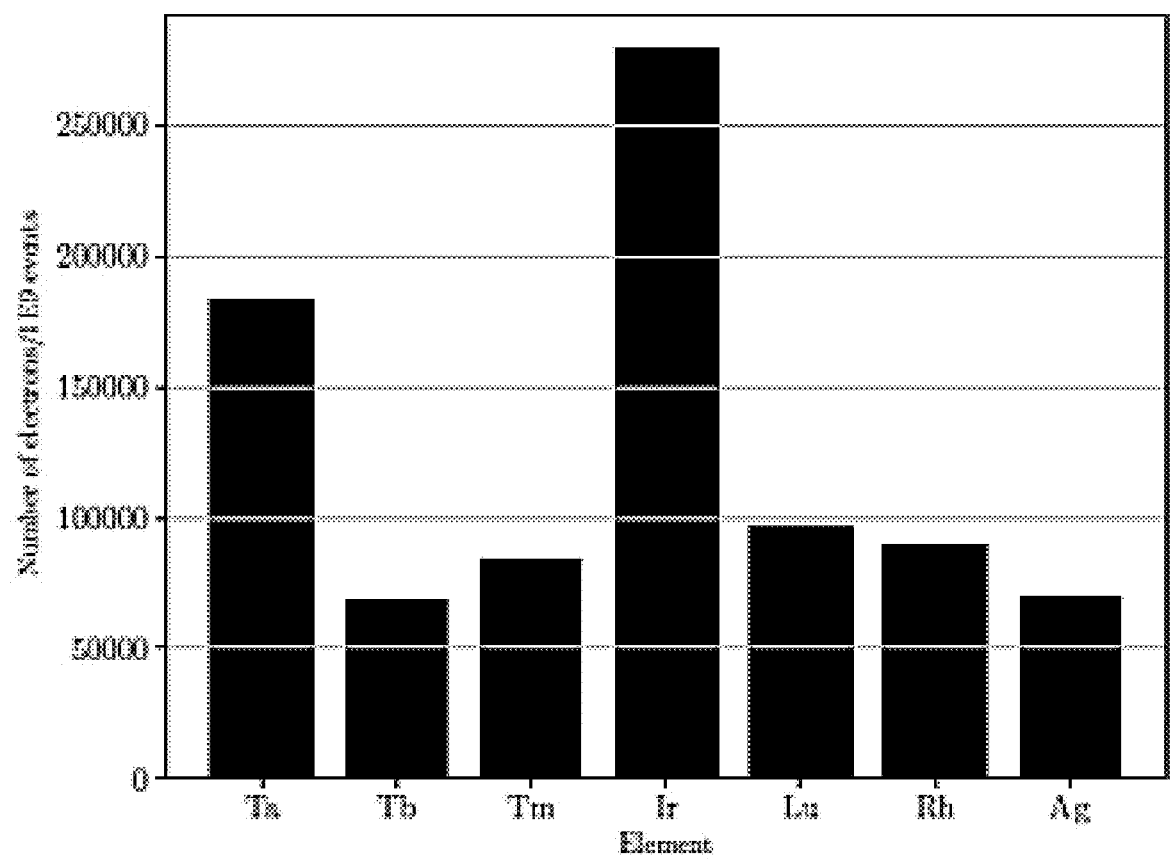
FIG. 10 shows the results of the Geant4 simulation that show the number of electrons produced in the emitter in each material per $10^9$ events.

The results of the Geant4 simulation that show the number of electrons produced in the emitter in each material per $10^9$ events are provided in FIG. 10.

Figure 11:
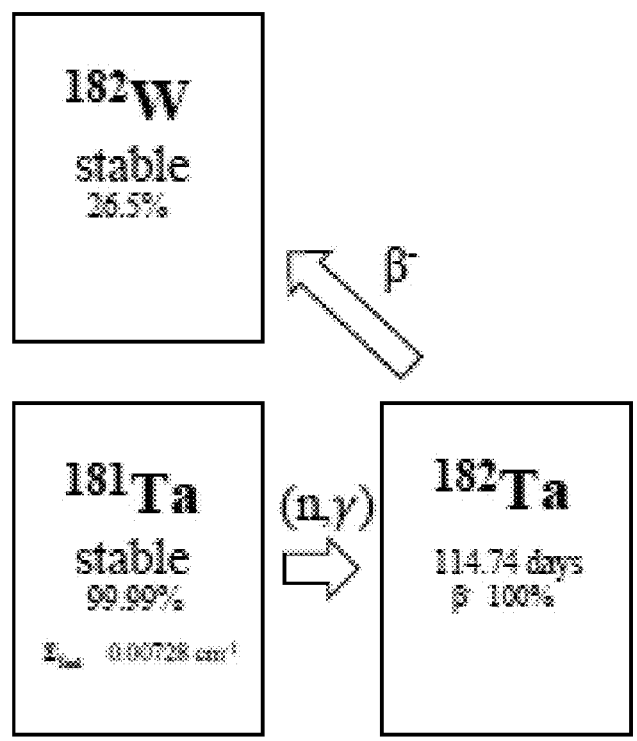
FIG. 11 is a schematic diagram of the tantalum reaction chain assuming a neutron-capture reaction on $^{181}$Ta.
Figure 12:
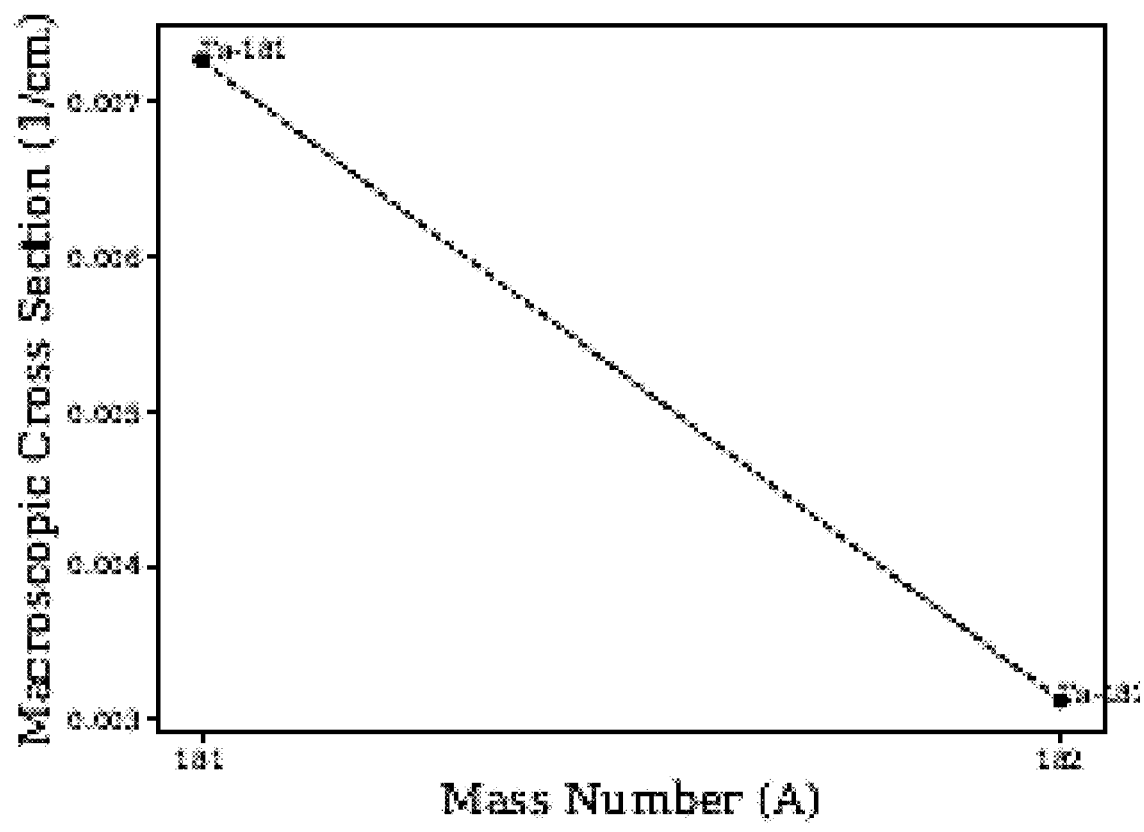
FIG. 12 is a macroscopic neutron-capture fast-group cross section of all relevant tantalum isotopes for which there are data in ENDF.

Tantalum produces many electrons per unit volume and is readily available. It is an ideal prompt-type candidate because it has one naturally occurring isotope, $^{181}$Ta. The β decay half-life of the (n, γ) reaction product, $^{182}$Ta, is 114 days, which is sufficiently long to minimize β– decay as a source of background noise in the detector response function. FIG. 11 is a diagram of the tantalum reaction chain assuming a neutron-capture reaction on $^{181}$Ta. The diagram includes β decay half-lives; abundance, if stable; and the calculated macroscopic neutron-capture fast-group cross section for the first isotope in the reaction chain. FIG. 12 is a macroscopic neutron-capture fast-group cross section of all relevant tantalum isotopes for which there are data in ENDF. As shown in FIG. 11, $^{182}$Ta has a 100% β– decay branching ratio. This single path of decay coupled to the relatively low (n,γ) macroscopic cross section of $^{182}$Ta (FIG. 12) indicates that the detector signal output would have a predominantly prompt signal output from the primary decay channel. This signal would evolve over the life of the FS-SPND as material transmutation alters the initial composition of the emitter.

Figure 13:
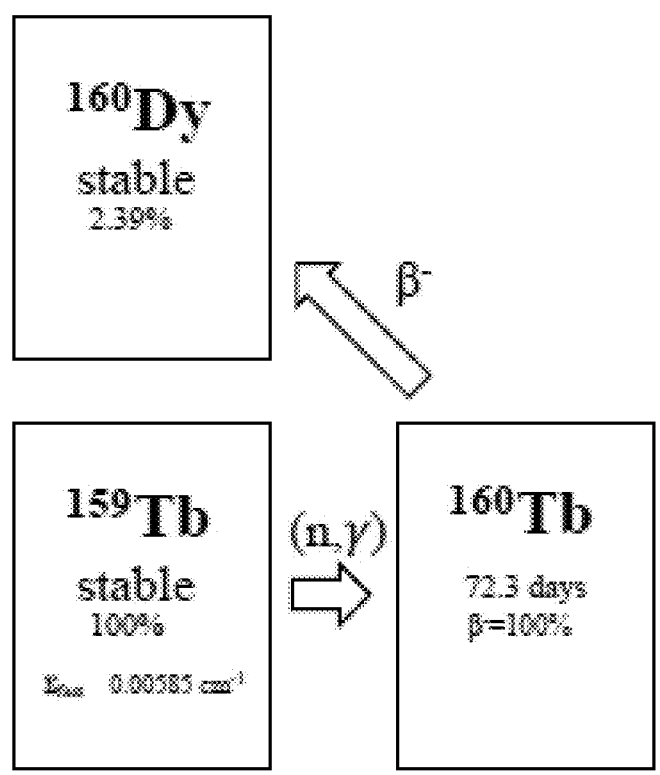
FIG. 13 is a schematic diagram of the terbium reaction chain, assuming a neutron-capture reaction on $^{159}$Tb.

Terbium has one stable isotope, $^{159}$Tb, and the neutron-capture reaction product, $^{160}$Tb, has a β decay half-life of 72 days with a 100% β⁻ decay branching ratio, as shown in FIG. 13. FIG. 13 is a diagram of the terbium reaction chain, assuming a neutron-capture reaction on $^{159}$Tb. The diagram includes β decay half-lives; abundance, if stable; and the calculated macroscopic neutron-capture fast-group cross section for the first isotope in the reaction chain. FIG. 13 indicates that, like tantalum, the response function from a terbium SPND would be entirely prompt. However, the cross section dataset for $^{160}$Tb reactions in ENDF is limited.

Figure 14:
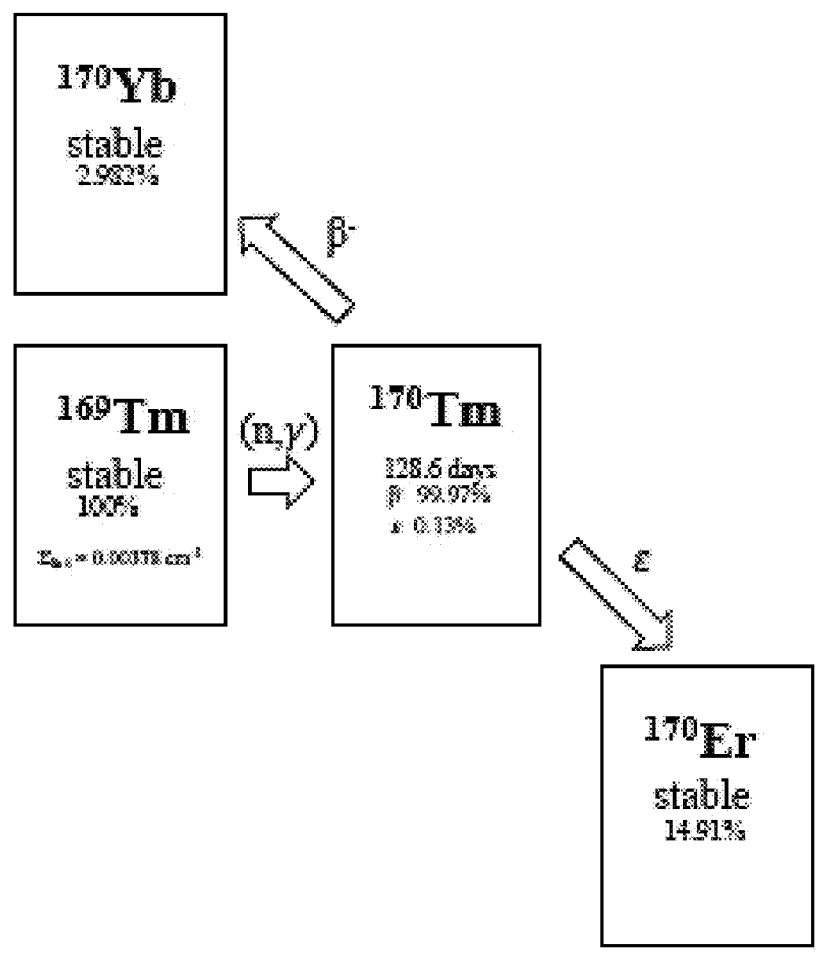
FIG. 14 is a diagram of the thulium reaction chain, assuming a neutron-capture reaction on $^{169}$Tm.
Figure 15:
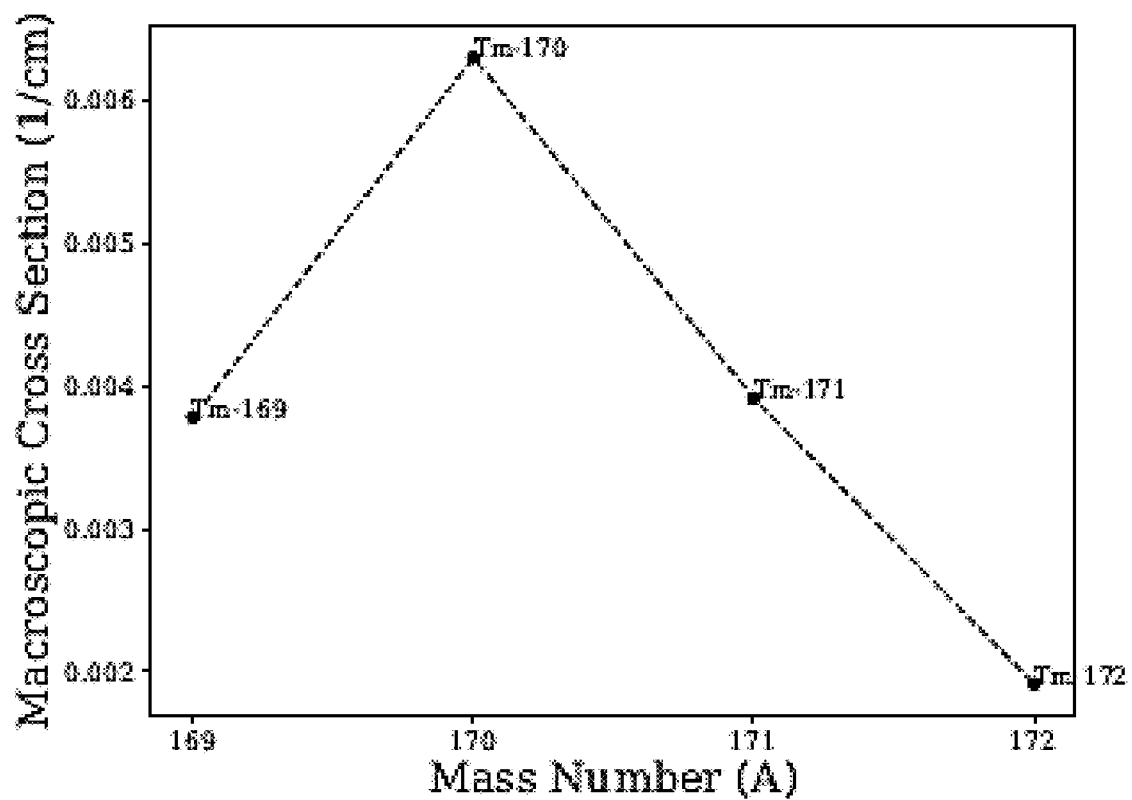
FIG. 15 is a macroscopic neutron-capture fast-group cross section of all relevant thulium isotopes for which there are data in ENDF.

Like tantalum and terbium, thulium is readily available, machinable, and has only one stable isotope, $^{169}$Tm. The neutron-capture reaction product, $^{170}$Tm, has a suitably long β decay half-life of 128 days. FIG. 14 is a diagram of the thulium reaction chain, assuming a neutron-capture reaction on $^{169}$Tm. The diagram includes β decay half-lives; abundance, if stable; and the calculated macroscopic neutron-capture fast-group cross section for the first isotope in the reaction chain. FIG. 15 is a macroscopic neutron-capture fast-group cross section of all relevant thulium isotopes for which there are data in ENDF. As shown in FIG. 14, $^{170}$Tm has a very small, 0.13%, electron-capture branching ratio decaying to stable $^{170}$Er. However, this should not be an issue in this detector due to the length of the β decay half-life in this case and the very small size of the electron-capture branching ratio. However, the signal from this detector will be slightly more complicated than for tantalum and terbium due to the relative strength of the macroscopic fast-group neutron-capture cross section of $^{169}$Tm to $^{170}$Tm, as shown in FIG. 15.

Figure 16:
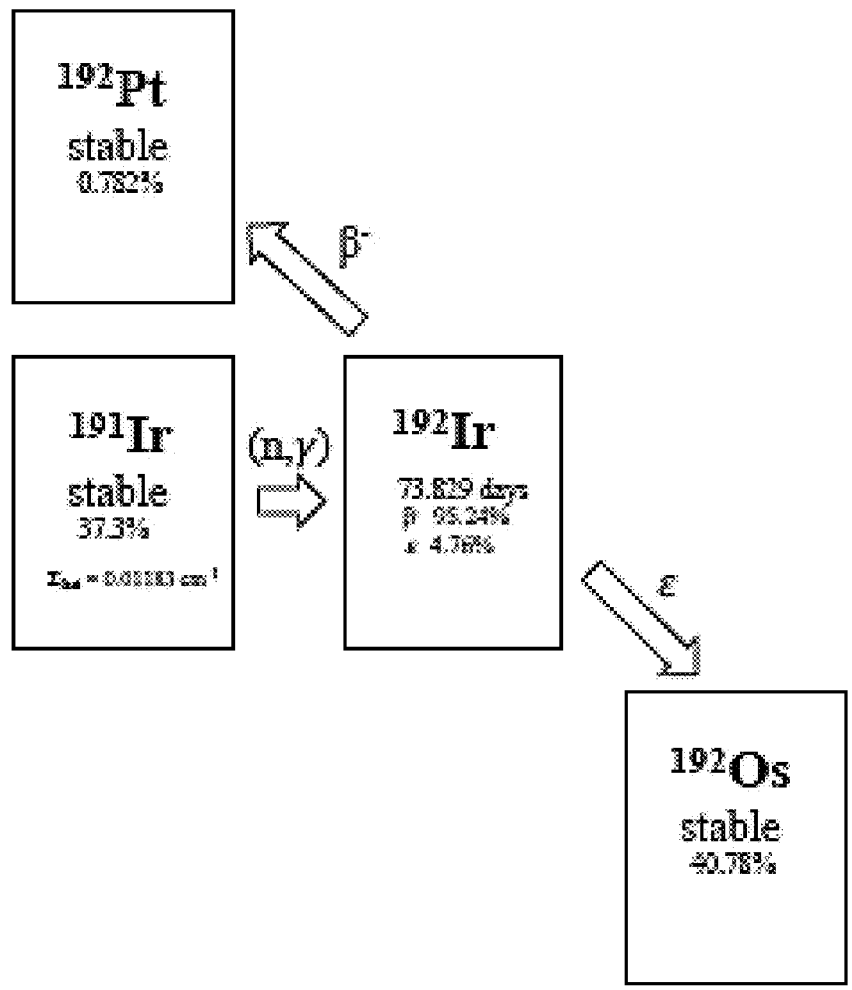
FIG. 16 is a schematic diagram of the $^{191}$Ir reaction chain.
Figure 17:
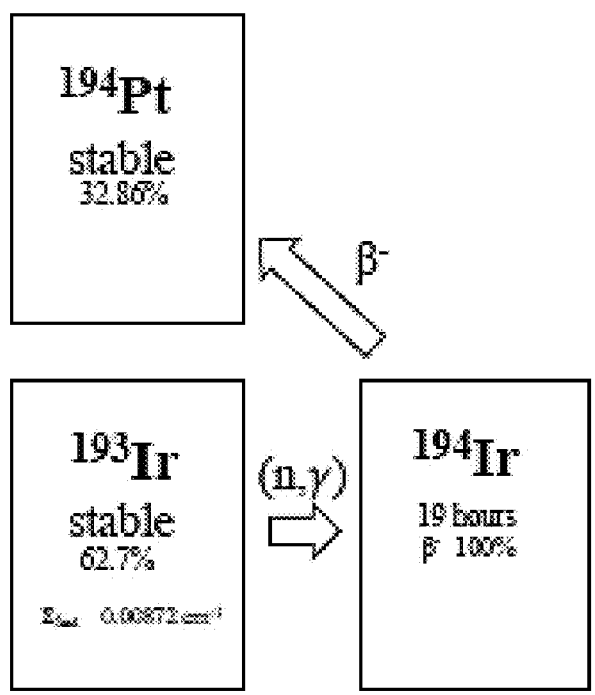
FIG. 17 is a schematic diagram of the $^{193}$Ir reaction chain.
Figure 18:
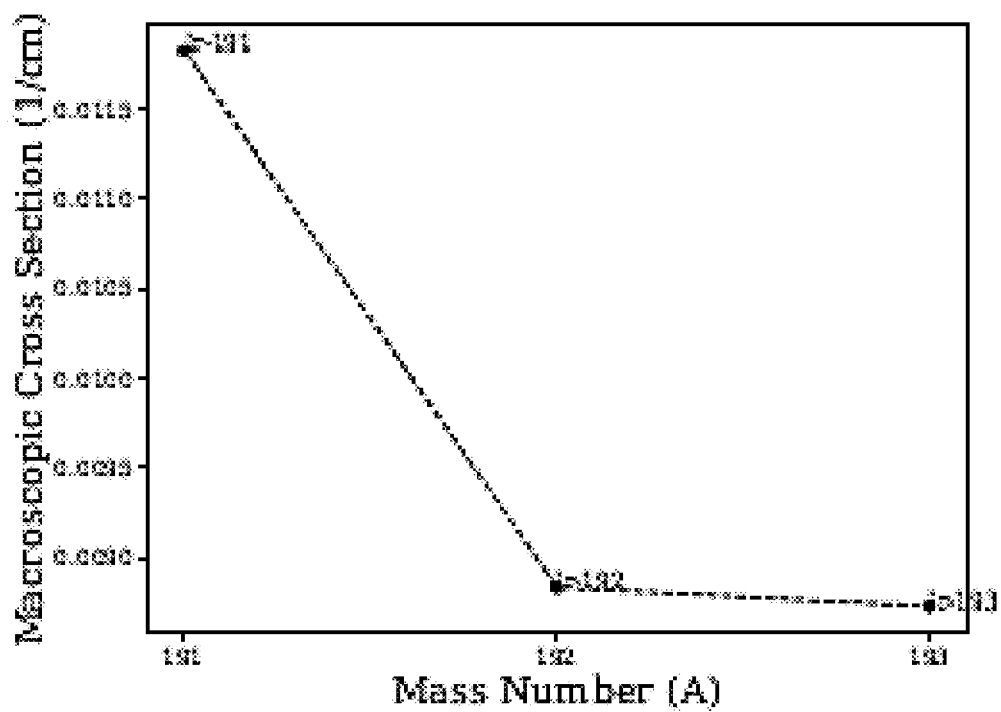
FIG. 18 is a macroscopic neutron-capture fast-group cross section of all relevant iridium isotopes for which there are data in ENDF.

Although iridium produces more electrons per unit volume in the expected reactor flux than tantalum, it has two stable isotopes, $^{191}$Ir and $^{193}$Ir. The reaction chains and relative abundances are shown in FIGS. 16 and 17, respectively. FIG. 16 is a diagram of the $^{191}$Ir reaction chain. FIG. 17 is a diagram of the $^{193}$Ir reaction chain. The diagrams include β decay half-lives; abundance, if stable; and the calculated macroscopic neutron-capture fast-group cross section for the first isotope in the reaction chain. FIG. 18 is a macroscopic neutron-capture fast-group cross section of all relevant iridium isotopes for which there are data in ENDF. $^{194}$Ir, which is the neutron-capture reaction product of the more abundant $^{193}$Ir, has a β decay half-life of 19 h. This is too short to make iridium an ideal prompt-type emitter candidate and too long to qualify as an acceptable delayed-type candidate. This is somewhat mitigated by the large comparative macroscopic fast-group neutron-capture cross section of $^{191}$Ir compared with $^{193}$Ir because that the reaction product, $^{192}$Ir, has a suitably long β decay half-life of 73 days. However, the combination of these factors indicate that an iridium SPND would have a complicated and less desirable response function.

Figure 19:
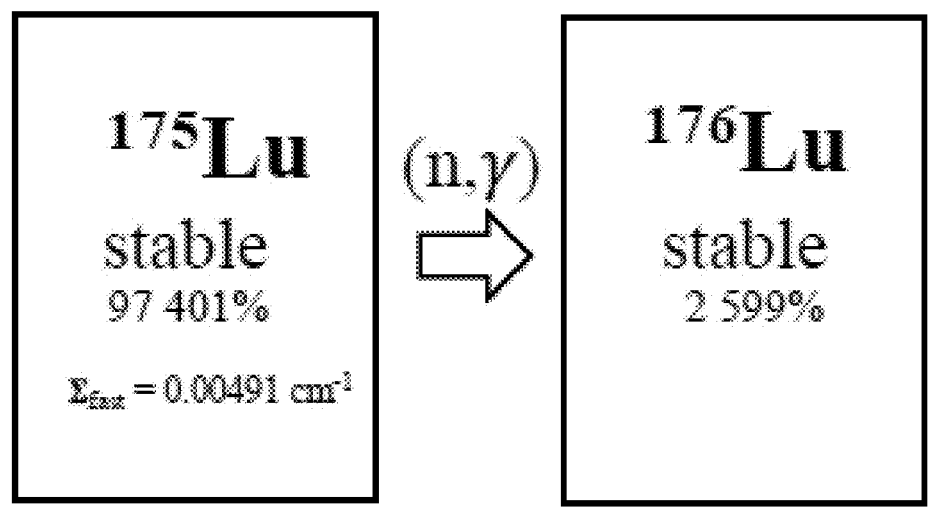
FIG. 19 is a schematic diagram of the $^{175}$Lu reaction chain.
Figure 20:
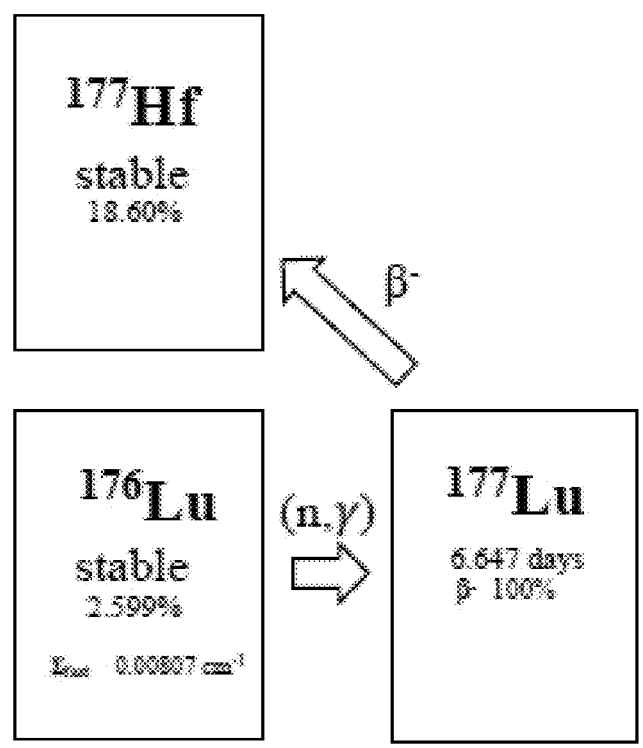
FIG. 20 is a schematic diagram of the $^{176}$Lu reaction chain.
Figure 21:
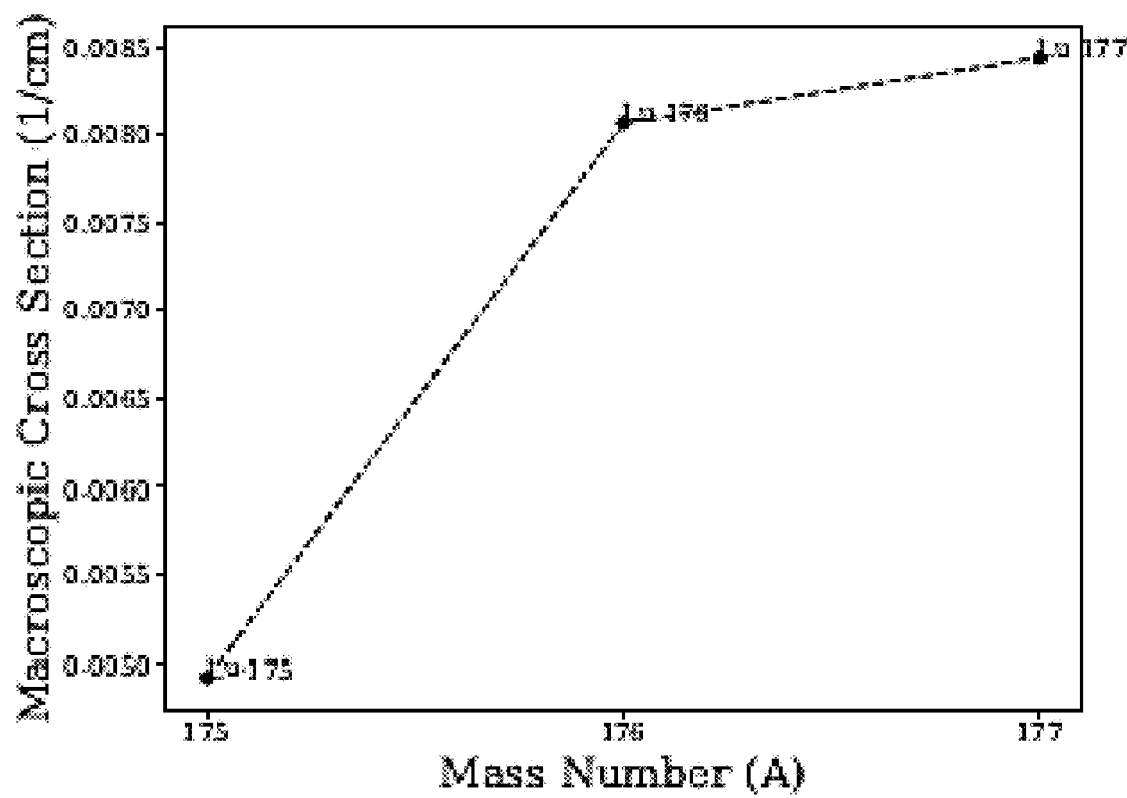
FIG. 21 is a macroscopic neutron-capture fast-group cross section for all relevant lutetium isotopes.

Lutetium appears to be similar to iridium because it has two stable isotopes: Lu, which is 97.4% abundant, and $^{176}$Lu, which is 2.6% abundant. FIG. 19 is a diagram of the $^{175}$Lu reaction chain. FIG. 20 is a diagram of the $^{176}$Lu reaction chain. The diagrams include β decay half-lives; abundance, if stable; and the calculated macroscopic neutron-capture fast-group cross section for the first isotope in the reaction chain. FIG. 21 is a macroscopic neutron-capture fast-group cross section for all relevant lutetium isotopes. The extreme comparative abundance of $^{175}$Lu means that the relatively short-lived $^{177}$Lu (6.6 days) is only produced in the bulk of the material after two neutron-captures, as shown in FIGS. 19 and 20. This will be a relatively slow process due to the comparatively small macroscopic cross section of $^{175}$Lu when compared with $^{176}$Lu, as shown in FIG. 21, but it is captured in the Geant4 simulation.

The two delayed-type candidates, rhodium and silver, produce a lower number of electrons per unit volume than most of the other prompt-type emitter materials. They are less desirable for use in a fast-nuclear reactor than the prompt-type candidates outlined previously.

Figure 22:
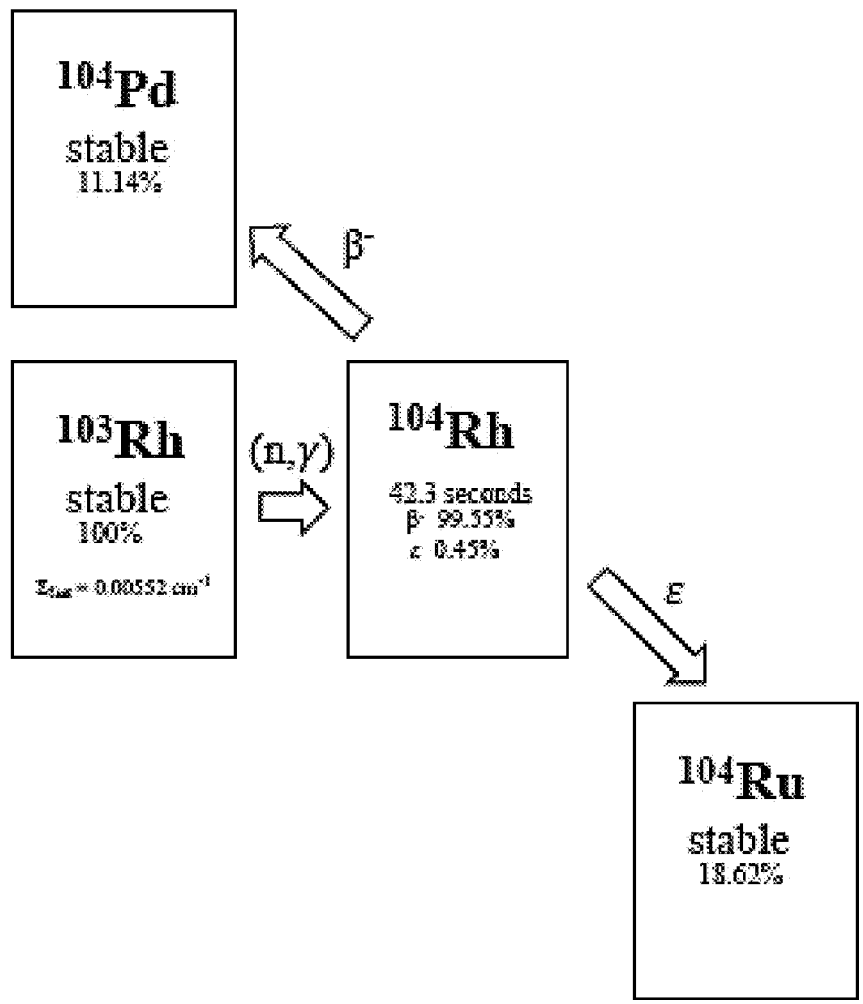
FIG. 22 is a schematic diagram of the $^{103}$Rh reaction chain.
Figure 23:
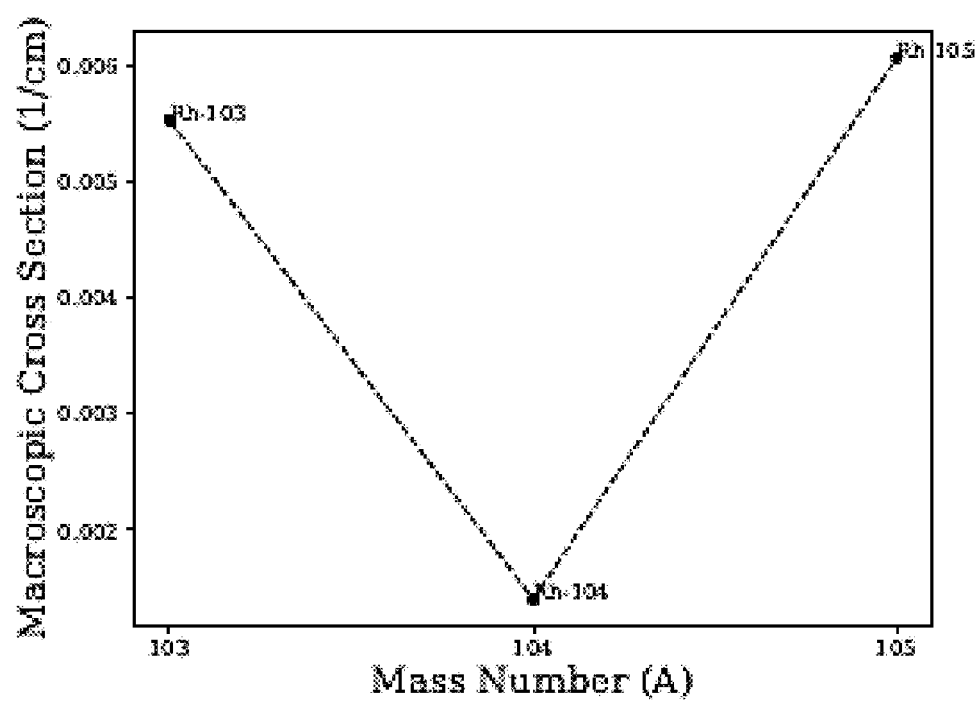
FIG. 23 is a macroscopic neutron-capture fast-group cross section for all relevant rhodium isotopes.
Figure 24:
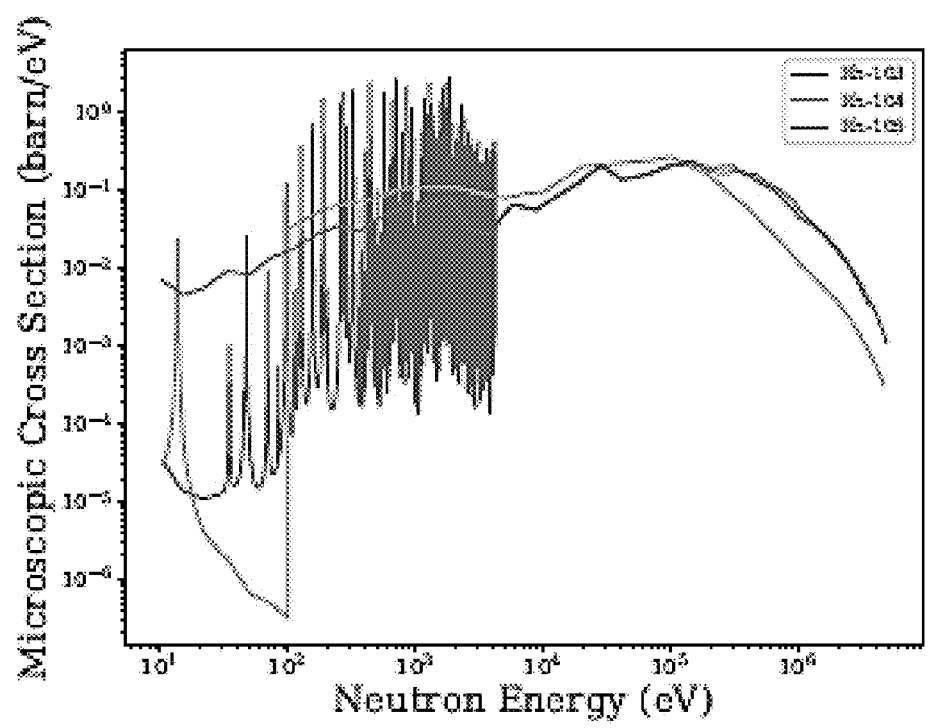
FIG. 24 is a microscopic neutron-capture cross section for all relevant rhodium isotopes.

Rhodium is a common emitter in thermal nuclear reactors due to its high sensitivity, and thus it is thoroughly characterized. FIG. 22 is a diagram of the $^{103}$Rh reaction chain. The diagram includes β decay half-lives; abundance, if stable; and the calculated macroscopic neutron-capture fast-group cross section for the first isotope in the reaction chain. FIG. 23 is a macroscopic neutron-capture fast-group cross section for all relevant rhodium isotopes. FIG. 24 is a microscopic neutron-capture cross section for all relevant rhodium isotopes. The sensitivity of $^{103}$Rh to thermal neutrons is driven by a large resonance in the $^{103}$Rh (n, γ) cross section that coincides with thermal neutron energies, as shown in FIG. 24.

Rhodium has only one stable isotope: $^{103}$Rh; the decay chain is shown in FIG. 22. The neutron-capture reaction product, $^{104}$Rh, has a sufficiently short half-life of 42 s for a delayed-type SPND. $^{104}$Rh does have a small (0.130%) but non-negligible feeding to a meta-stable state in its β$^-$ decay daughter, $^{104}$Pd, with a half-life of 4.3 min that slows the detector response. However, the dominant 42 s decay path through $^{104}$Pd has a $Q_\beta$ value of 2.44 MeV and a 98% feeding to the ground state, making any β$^-$ particles produced within the emitter likely to have an energy high enough to be able to escape the emitter, travel to the collector, and produce a signal in the detector. Moreover, $^{104}$Rh has a significantly lower fast-group macroscopic cross section, as shown in FIG. 23, making the signal from this detector predominantly delayed in nature.

Figure 25:
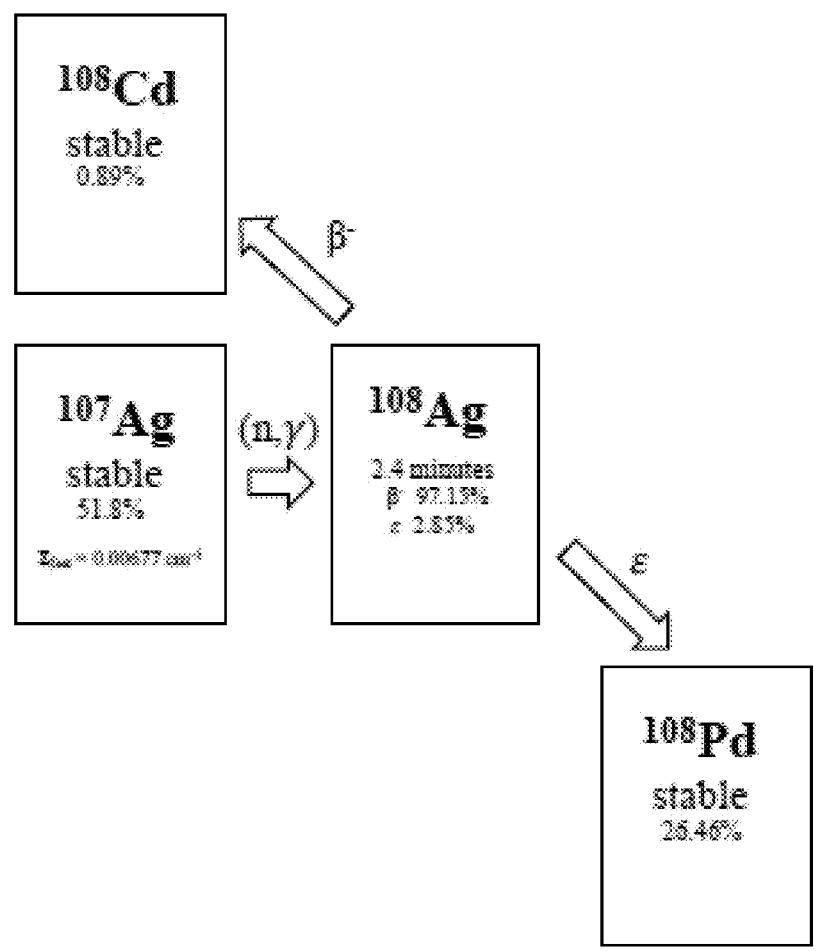
FIG. 25 is a schematic diagram of the $^{107}$Ag reaction chain.
Figure 26:
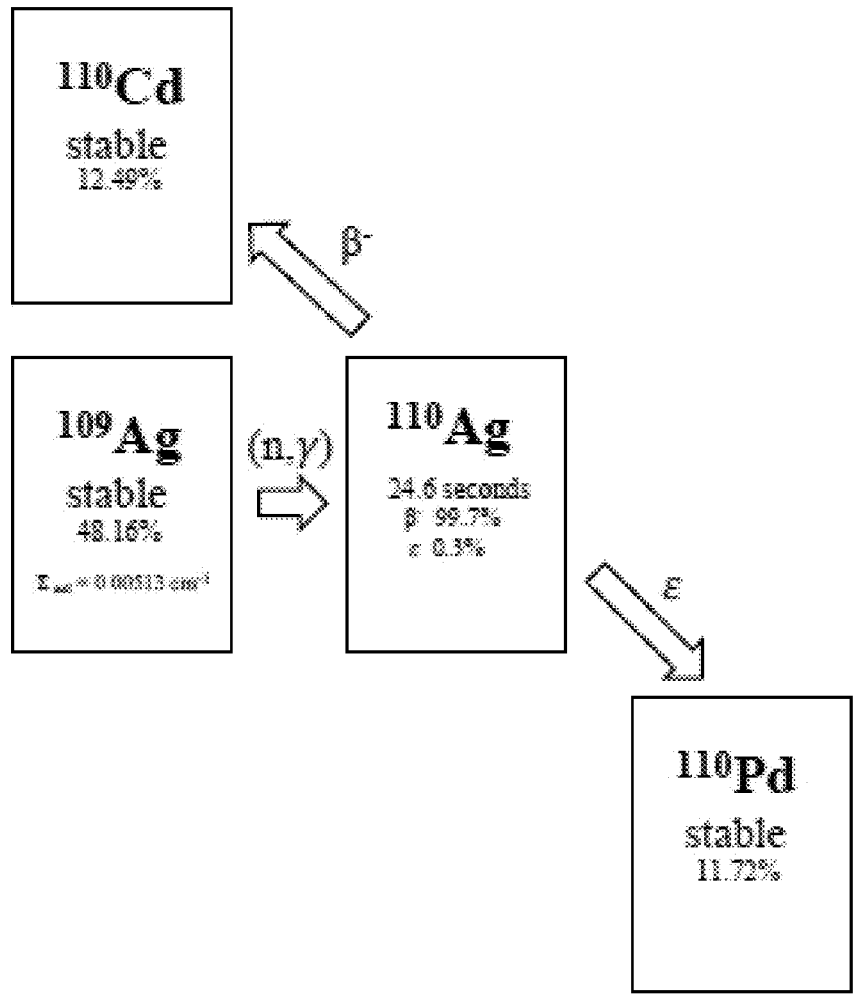
FIG. 26 is a schematic diagram of the $^{109}$Ag reaction chain.
Figure 27:
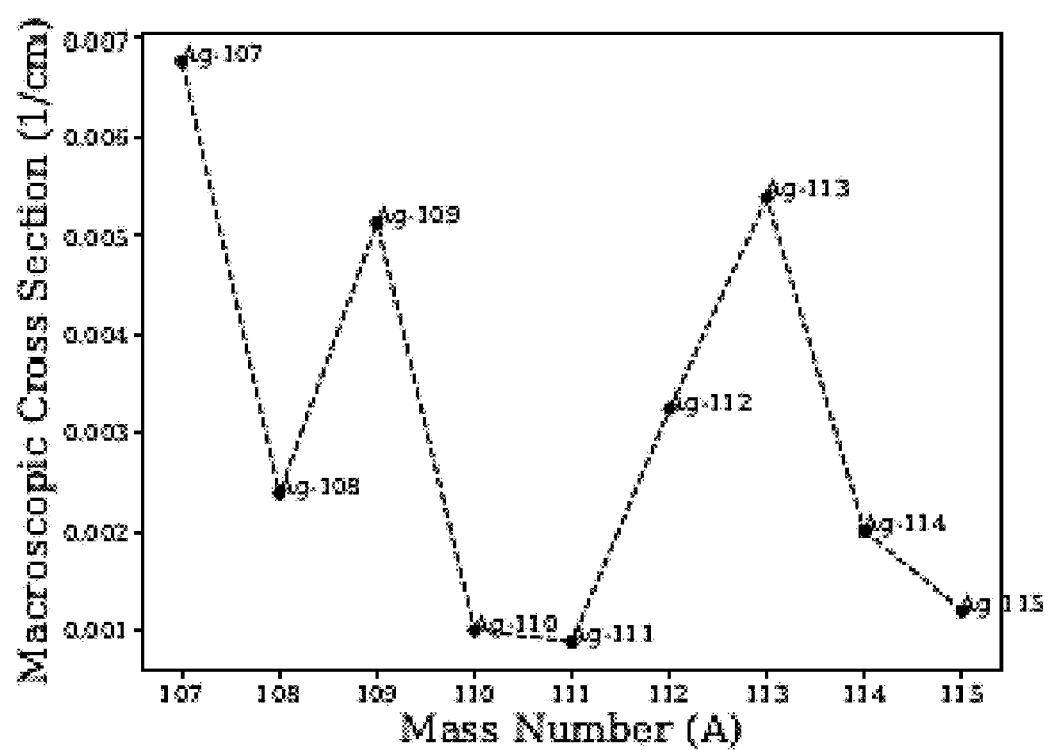
FIG. 27 is a macroscopic neutron-capture fast-group cross section for all calculated silver isotopes.

Silver not only produces less electrons per unit volume but it also has two stable isotopes, $^{107}$Ag and $^{109}$Ag, as shown in FIGS. 25 and 26. FIG. 25 is a diagram of the $^{107}$Ag reaction chain. FIG. 26 is a diagram of the $^{109}$Ag reaction chain. The diagrams include β$^-$ decay half-lives; abundance, if stable; and the calculated macroscopic neutron-capture fast-group cross section for the first isotope in the reaction chain. FIG. 27 is a macroscopic neutron-capture fast-group cross section for all calculated silver isotopes. Although both neutron-capture reaction products are sufficiently short-lived for a delayed-type SPND-2.4 min and 24.6 s, respectively—this makes the detector response more complicated and therefore less ideal. Additionally, $^{107}$Ag has the largest fast-group macroscopic cross section, as shown in FIG. 27, indicating that the slower, 2.4 min component would dominate the detector response of a silver SPND deployed in a fast-neutron spectrum.

Through a thorough analysis of ENDF cross section data, five prompt-type candidate emitter materials were determined as suitable for fast-spectrum reactors: tantalum, terbium, thulium, lutetium, and iridium. Iridium is a previously known, although rarely used, emitter. The most promising candidates are tantalum, terbium, and thulium, listed in order of suitability. Also identified were two commonly used delayed-type emitters as suitable for use in a fast-reactor spectrum: rhodium and silver. Calculations indicate that the prompt-type emitters described herein outperform the delayed-type.

The calculated burn up rates and Geant4 simulations for the chosen prompt-type emitter candidates in a fast reactor flux are comparable with those of existing high-sensitivity emitters operating in thermal-neutron fluxes. Therefore, it is expected that each of the identified prompt-type candidates to produce a suitably sensitive detector for the application.

Figure 28:
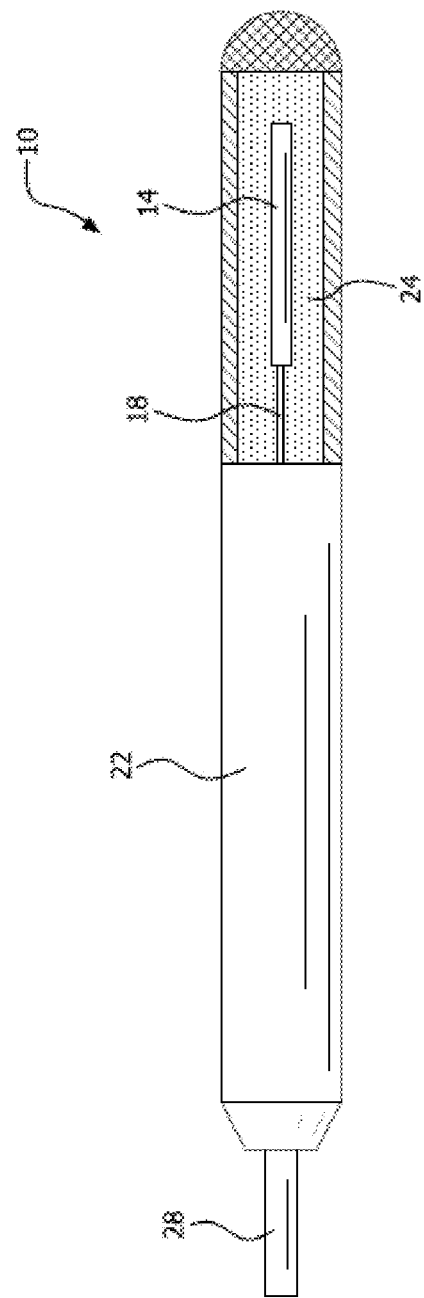
FIG. 28 is a schematic diagram, partially in cross section, of an SPND according to the invention.
Figure 29:
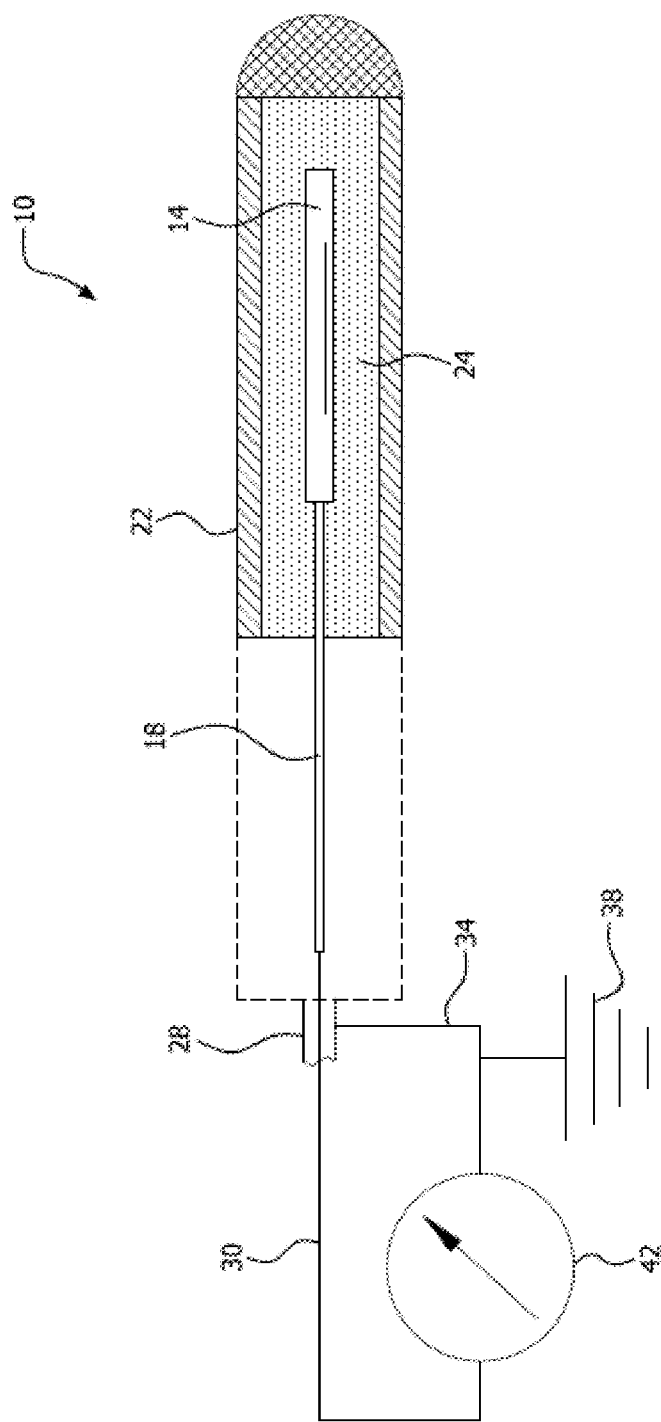
FIG. 29 is a schematic diagram, partially in cross section and partially in phantom, of an SPND and supporting circuitry.
Figure 30:
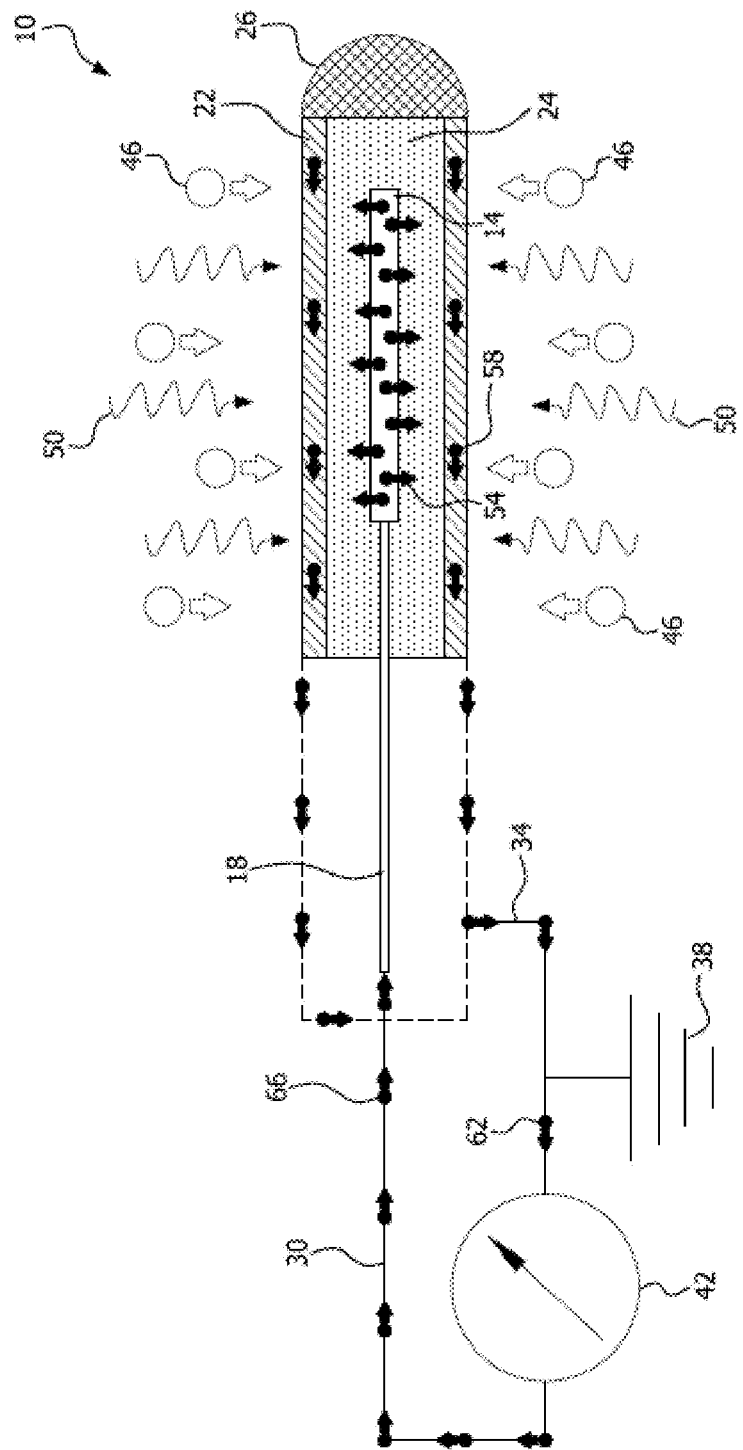
FIG. 30 is a schematic diagram of the SPND of FIG. 29 in operation.

There is shown in FIGS. 28-30 a detector 10. The detector includes an emitter 14 mounted on a conductive mounting wire 18. The emitter 14 is encased within a conductive sheath 22 which can have an end cap 26. An insulation 24 surrounds the emitter 14 within the sheath 22. A cable 28 has electrical conductors that are connected to the conductive mounting wire 18 and the conductive sheath 22.

A schematic circuit diagram is shown in FIG. 29. The conductive mounting wire 18 is connected to a conductor 30. The conductive sheath 22 is connected to a conductor 34. The conductor 30 and conductor 34 are connected to a ground 38 through a load 42. The load 42 is a meter calibrated to indicate the flow of current that is generated by the omission of electrons by the emitter 14 in response to a neutron flux.

There is shown in FIG. 30 the operation of the detector 10. Neutrons 46 and gamma radiation 50 generated by the nuclear reactor strike the detector 10. The neutrons 46 pass through the conductive sheath 22 and strike the emitter 14. The neutron and gamma fluxes cause the emitter 14 to generate electrons which pass through the insulation 24 as shown by arrows 54. Electrons reaching the conductive sheath 22 pass through the conductive sheath 22 as shown by arrows 58. The electrons then passed through the conductor 34 and meter 42 as indicated by arrow 62. Electrons return to the emitter wire 18 and emitter 14 through the conductor 30 as shown by arrows 66 to complete the circuit.

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:

1. A self-powered fast neutron detector for generating an electrical current that is proportional to a flux of neutrons, comprising:
 a neutron sensitive emitter;
 a conductive collector;
 an insulator between the neutron-sensitive emitter and the collector;
 an electrical connection to the neutron sensitive emitter; and
 an electrical connection to the conductive collector;
 wherein the neutron sensitive emitter comprises a Ta alloy of at least one selected from the group consisting of ASTAR-811C and T-111 and comprises an emitter material with no more than 2 stable isotopes, and which upon impact by a neutron having an energy of from 100 keV to 1000 keV will generate electrons in proportion to the flux of neutrons in less than 10 minutes, and any additional generated electrons not generated in less than 10 minutes will be generated in no less than 30 days; and
 wherein the detector provides a signal to noise ratio of greater than 1.5 for neutrons having an energy of between 100 keV and 1000 keV, wherein the signal is associated with electrons generated in less than 10 minutes and the noise is associated with electrons generated in more than 10 minutes.

2. The detector of claim 1, wherein the neutron-sensitive emitter comprises at least one emitter material selected from the group consisting of $^{181}$Ta, $^{159}$Tb, and $^{169}$Tm.

3. The detector of claim 1, wherein the neutron-sensitive emitter comprises at least one emitter material selected from the group consisting of Lu and Ir.

4. The detector of claim 3, wherein the Lu comprises in the neutron-sensitive emitter is at least one emitter material selected from the group consisting of $^{175}$Lu and $^{176}$Lu.

5. The detector of claim 3, wherein the Ir comprises at least one emitter material selected from the group consisting of $^{191}$Ir and $^{193}$Ir.

6. The detector of claim 1, wherein the insulator comprises at least one selected from the group consisting of MgO, $Al_2O_3$, and vacuum.

7. The detector of claim 1, wherein the collector is a sheath with an open interior, and the emitter and the insulator are positioned within the interior.

8. The detector of claim 7, wherein the emitter material is provided on a conductive support mounted within the open interior of the collector sheath, and the insulator is positioned between the emitter material and the collector sheath.

9. The detector of claim 1, wherein the collector comprises stainless steel.

10. The detector of claim 1, wherein the collector comprises Inconel.

11. The detector of claim 1, further comprising a current meter for measuring the electrical current generated by the flux of neutrons striking the emitter.

12. The detector of claim 11, further comprising a processor for relating the current measured by the current meter to the neutron flux.

13. A method of detecting neutrons generated by a nuclear reactor, comprising the steps of:
 providing a self-powered fast neutron detector comprising a neutron sensitive emitter; a conductive collector; an insulator between the neutron-sensitive emitter and the collector; and an electrical connection to the neutron sensitive emitter;
 providing an electrical connection to the conductive collector; wherein the neutron sensitive emitter comprises a Ta alloy of an emitter material comprising at least one selected from the group consisting of $^{159}$Tb and $^{169}$Tm and at least one selected from the group consisting of ASTAR-811C and T-111, the emitter material having no more than 2 stable isotopes, and which upon impact by a neutron having an energy of from 100 keV to 1000 keV will generate electrons in proportion to the flux of neutrons in less than 10 minutes or more than 30 days;
 exposing the neutron detector to neutrons having an energy of from 100 keV to 1000 keV, wherein electrons will be generated by the emitter material in proportion to the flux in less than 10 minutes, and any additional generated electrons not generated in less than 10 minutes will be generated in no less than 30 days;
 the detector generating a signal to noise ratio of greater than 1.5 for neutrons having an energy of between 100 keV and 1000 keV; wherein the signal is associated with electrons generated in less than 10 minutes, and the noise is associated with electrons generated in more than 10 minutes;
 using a current meter to measure the electrical current generated by the flux of neutrons striking the emitter; and,
 using a processor to relate the current measured by the current meter to the neutron flux.

14. The method of claim 13, wherein electrons are generated in less than 5 minutes.

15. The method of claim 14, wherein any electron not generated in less than 5 minutes will be generated in no less than 72 days.

16. The method of claim 13, wherein the nuclear reactor is configured and operated as a fast-spectrum nuclear reactor.

* * * * *